United States Patent [19]

Elmasry

[11] Patent Number: 4,666,819

[45] Date of Patent: May 19, 1987

[54] OPTICAL INFORMATION STORAGE BASED ON POLYMERIC DYES

[75] Inventor: Mohamed A. Elmasry, Woodbury, Minn.

[73] Assignee: Minnesota Mining and Manufacturing Company, St. Paul, Minn.

[21] Appl. No.: 710,175

[22] Filed: Mar. 11, 1985

[51] Int. Cl.$^4$ ............................................. G03C 1/72
[52] U.S. Cl. ................................. 430/270; 430/495; 430/945
[58] Field of Search .................... 430/495, 945, 270; 346/125.1, 76 L

[56] References Cited

U.S. PATENT DOCUMENTS

| | | | |
|---|---|---|---|
| 3,245,965 | 4/1966 | Tuemmier | 260/78.4 |
| 3,475,760 | 10/1969 | Carlson | 346/1 |
| 3,560,994 | 2/1971 | Wolff et al. | 346/135 |
| 4,139,853 | 2/1979 | Gherkiere et al. | 346/1 |
| 4,218,689 | 8/1980 | Bloom et al. | 346/135.1 |
| 4,241,355 | 12/1980 | Bloom et al. | 346/135.1 |
| 4,364,986 | 12/1982 | Zwanenburg et al. | 428/156 |
| 4,365,012 | 12/1982 | Hocker et al. | 430/19 |
| 4,380,769 | 4/1983 | Thomas | 346/135.1 |
| 4,501,876 | 2/1985 | Zahr | 528/232 |
| 4,581,317 | 4/1986 | Simmons | 430/495 |

FOREIGN PATENT DOCUMENTS 59-45195  3/1984  Japan .
59-62188  4/1984  Japan .

OTHER PUBLICATIONS

"Single Wavelength Optical Recording in Pure Solvent-Coated IR Dye Layers", by D. J. Gravesteijn, et al., Proceedings of SPIE, vol. 420, pp. 327–331, Jun. 1983.
IEEE Journal QE-14, 487, Bell, et al, 1978.

*Primary Examiner*—Won H. Louie
*Attorney, Agent, or Firm*—Donald M. Sell; James A. Smith; Lorraine R. Sherman

[57] ABSTRACT

An optical recording medium of thermoplastic, radiation-absorbing material comprises at least one polymeric dye which is capable of selective radiation absorption in the wavelength range 300–1000 nm so as to allow thermoplastic deformation of the material by a focused beam of radiation.

18 Claims, 6 Drawing Figures

OPTICAL INFORMATION STORAGE BASED ON POLYMERIC DYES

FIELD OF THE INVENTION

This invention relates to the recording of data in a thin supported polymeric dye layer by inducing microdeformations of the layer using a high energy density, finely focused beam of radiation in the wavelength range of 300–1000 nm. In another aspect, it relates to an information recording element comprising the above-described polymeric dye layer and a method for its use.

BACKGROUND ART

The use of thin, radiation absorbing layer on a substrate as an optical recording medium operated by ablation of image areas is well known in the art. The expansion of the layer assembly to include reflective and/or interference layers is also known. The earlier examples of these used evaporated metal coatings on a substrate (see U.S. Pat. No. 3,560,994 and IEEE Journal QE-14, 487 (1978)). Later examples used organic materials as the absorber.

Vacuum-coated, light-absorbing layers of dyes or other absorbing organic compounds have been disclosed for ablative optical recording (U.S. Pat. No. 4,218,689). These however involve the costly vacuum-coating process and are not erasable/reusable.

Media for recording information by thermally altering the physical structure of a material are known. U.S. Pat. No. 3,475,760 describes such a medium for recording information as a thermal deformation pattern (doing so without requiring the formation of an electrical charge pattern on the medium). The medium is a 1 to 10 micrometer thick layer of a solvent-coated thermoplastic material on a support. The patent teaches that some thermoplastic materials, with, if necessary, pigments or dyes added to adsorb radiation strongly at the wavelength of a laser beam having a diameter of less than 10 micrometers, can be thermally deformed by that laser beam so that some of the thermoplastic material is displaced from the area illuminated by the beam to form ridges along the edges of that area. This deformation pattern retains its shape after the laser beam is "removed" and may be read by projecting the pattern onto a viewing screen as a Schlieren image, or viewing the image through Schlieren optics.

U.S. Pat. No. 4,139,853 describes a material for recording the information carried by a modulated laser beam comprising a support bearing a 0.5 to 10 micrometer thick recording layer comprising a thermoplastic polymer having dissolved therein up to 10 percent by weight of an organic dye which provides a specular density of at least 0.1 to the layer with respect to the wavelength of the recording laser. Such recording material is said to develop light scattering centers with a minimum increase of white light specular density of 0.2 with respect to the background when exposed to a light energy dose of at least $1 \times 10^6$ erg/cm$^2$ (0.1 watt sec/cm$^2$) with a focused laser beam having a beam intensity of at least $1.0 \times 10^{11}$ erg/cm$^2$.sec ($1 \times 10^4$ watts/cm$^2$). Information recorded on such material is read by scanning with the recording laser beam with its power reduced to about one tenth of that used for recording.

U.S. Pat. No. 4,364,986 discloses optical recording layers on a substrate in which the concentration of absorbing dye can be raised to very high levels (up to 94 weight %) while maintaining high clarity. The copolymer used as the thermoplastic binder is described as a 1:1 copolymer of methyl vinyl ether and maleic anhydride or a semi-ester of the copolymer and a low melting point monohydroxyalcohol. Ionic dyes are preferred to attain the high concentration levels.

U.S. Pat. No. 4,380,769 discloses that a dye-polymer layer can be thermally deformed by laser light absorbed by the dye, and read by a second laser not absorbed by the dye but scattered by the deformations. Very thin layers can then be used which enable high information density in the record to be achieved at high signal/noise ratio. One dye is disclosed (Iosol Red) which is capable of being coated out of solvent and has subsequent use in recording without any binder. (This dye is also known as CI Solvent Red 68 but no structure has been disclosed).

A paper entitled "Single Wavelength Optical Recording in Pure Solvent-Coated IR Dye Layers" by D. J. Gravesteijn, C. Steinbergen, and J. van der Veen (Philips, Endhoven) was published in Proceedings of SPIE, Vol. 420, page 327–331, which published the papers at a conference on Optical Storage Media in June 1983. This discloses layers of squarylium dye and of certain pentamethine ionic dyes which can be solvent-coated on suitable substrates to give layers of the order of 100 nm thick. These are shown to have good optical recording properties when used in the deformation mode.

Kokai JA59-45195, laid open Mar. 13, 1984, discloses hydrocarbon backbone polymers with pendent chromophores, e.g., azo, anthraquinone, indigoid, cyanine, etc. Polymers are thermoplastic and film forming, and are useful as thin coated layers for deformation optical recording.

Kokai JA59-62188, laid open Apr. 9, 1984, discloses various polymer backbones, e.g., polyester, polyurethane, polyamide, vinyl polymers, etc., with pendent phthalocyanine (preferably metal) chromophores. Polymers are thermoplastic and film forming, and useful as thin coated layers for deformation optical recording.

U.S. Pat. No. 4,365,012 discloses cyclic polyimides solution coated onto a substrate and used to form images by photochromism. No ablation or deformation of the coated layer is involved. These polymers are represented by the general formula

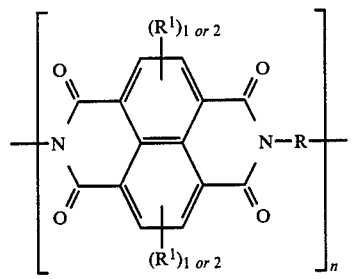

where R is a divalent aliphatic group containing an electron donor function and n can be from 2 to 1000.

Offenlegungsschrift DE No. 3007296A1 discloses polymeric photochromic indigoid dyes in which the backbone is a hydrocarbon and the chromophores are pendent from it. The polymeric dyes are used for optical recording. No thermoplastic deformation is disclosed.

U.S. Pat. No. 4,241,355, in teaching ablative recording layers of vacuum evaporated phthalocyanine dyes, discloses that poly(chlorophthalocyanine) decomposed on heating and that copper poly(chlorophthalocyanine) did not evaporate at 400° C.

U.S. Pat. No. 3,245,965 teaches that polyphthalocyanines and their metal derivatives are not solvent soluble and are not easily melted. Thin layers on a substrate are obtained by reaction of pyro-mellitonitrile at the surface.

Oligomeric dyes have been disclosed in U.S. Pat. No. 4,365,012 useful as photosensitive materials in optical recording devices.

Polymeric dyes per se are widely disclosed in the literature. Of particular prominence is their use as food colorings, and in the bulk or surface coloring of plastic objects and textile fibers.

SUMMARY OF THE INVENTION

Briefly, the invention provides an optical recording medium of thermoplastic, radiation-absorbing material comprising at least 1 and preferably at least 10% by weight of at least one polymeric dye. The dyes, although sufficiently absorbing of wavelengths in a selective absorption region (300 to 1000 nm) to allow thermoplastic deformation of the layer by a focused laser beam, are sufficiently stable so as not to be chemically changed under these conditions. Also, there can be no substantial change in optical properties of the medium. The signal is imprinted and may be erased by a succeeding laser or thermal treatment. Inside the selective absorption band the dyes allow reading of the imprinted signal by Schlieren techniques, or differential absorption, or scattering of a reading light beam, without sufficient energy being absorbed to invoke further thermoplastic change. Outside the absorption bands, equal or better reading can be accomplished with scattering or Schlieren techniques. Absorption bands centered on wavelengths in the range 300 nm to 1000 nm are available.

The optical recording medium can comprise in the range of 99 to 0 percent by weight of a thermoplastic non-chromophore-containing polymeric material.

The invention includes but is not limited to layers consisting essentially of the polymeric dyes. Mixtures of non-chromophoric polymers with polymeric dyes may be used, particularly where the major component of the mix is polymeric dye. High polymeric dye concentrations (70 to 100 weight %) can be obtained with a wide range of nonchromophoric polymers without affecting the clarity of the layer. However, any concentration of the polymeric dye in the range of 1 to 100 weight percent may be used as suits the requirements of the particular use, e.g., recording system, optical filter, etc.

The polymeric dyes are intended for use under recording conditions giving thermoplastic deformation of the layer.

The prior art describes molecular dyes dispersed in thermoplastic binders for deformation recording (e.g. U.S. Pat. Nos. 4,364,986 and 4,380,769). The use of polymeric dye layers has the following advantages over that art.

1. High chromophore concentrations can be obtained without the special solubility relationships required between dye and binder
2. High clarity of the layer is easily obtained thus giving less background noise.
3. The chromophores do not migrate or become lost from the layer during the thermoplastic action, thus facilitating reuse.
4. There is no danger of dye crystallization on keeping.
5. Polymeric dyes are frequently more stable to heat than the individual dyes, e.g., IR chromophores.

Vacuum deposition of molecular dye layers as presented in the prior art is a costly and slow operation compared with solvent coating, and it results in layers useful only for ablative procedures, and can be used only once for recording.

There are examples in the prior art of film-forming dyes produced by solvent coating which proved useful in thermoplastic recording. However the first reference (U.S. Pat. No. 4,380,769—Iosol Red) reports that this coating "self-erases with time at room temperature", a disadvantage not present in the polymeric dyes disclosed here. The second (Gravesteijn et al. paper in Proc. SPIE Vol. 420, supra) describes molecular dyes carefully tailored to have the required solubility and absorption properties.

At the exposing laser wavelength within the dye absorption band, the absorption coefficient of the layer should be at least $10^3$ cm$^{-1}$ in order that images may be formed with reasonable laser beam intensities.

A wide range of polymeric dyes satisfy the requirements of these recording media. However, in general, they should be linear homopolymers of chromophoric moieties, or linear copolymers of chromophoric and non-chromophoric moieties. In the visible and near UV regions representative dyes consist of a polymeric backbone containing phenylene and imino groups, with chromophores selected from the azo dyes and tricyanovinylated aryl compounds. In the near infra-red region polymers based on heptamethine carbocyanine dyes are disclosed as valuable. The methine chain is rigidized to improve the stability of the chromophores which are linked in one class by the generic characteristic of heterocyclic nitrogens with an intermediate hydrocarbon chain and in another class by the generic characteristic of a linkage through the 4, 5, 6, or 7 positions of an indolyl or related end group with intermediate sulfonyl groups, hydrocarbon chains, or vinyl groups.

As used in this application:

"thermoplastic deformation" means a stable alteration of the form of a plastic substance under the influence of heat, the altered form being capable of returning to its unspoiled state by further application of heat;

"polymeric dye" means a molecule having at least 5 recurring monomeric units;

"methine" means a

group to provide a moiety with alternating single and double bonds; and

"tricarbocyanine" or "carbocyanine" means a seven-membered methine chain connecting two heterocyclic nitrogen-containing group where the nitrogen atoms are part of the conjugated chain;

"alkyl", "alkoxy", "alkylamino", and "dialkylamino" mean groups containing 1 to 6 carbon atoms for each "alkyl" unless otherwise specified.

Novel (1) polymeric cyanine dyes and novel (2) condensed polymeric dye and novel (3) polymers derived from copolymerized ethylenically-unsaturated monomers are disclosed in Assignee's copending patent applications, Ser. Nos. 710,077 and 710,174, respectively, filed the same date as this invention.

DETAILED DESCRIPTION OF THE DRAWINGS

Figure 1:
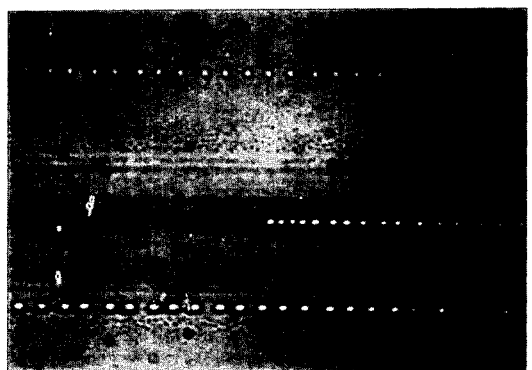
FIG. 1 is a photomicrograph of image spots formed by deformation of dye layers according to the present invention.

FIG. 1 shows a photomicrograph of a recording element of the present invention having polymeric dye layer 18 with deformed spots 16 therein after 10 write/erase cycles.

Figure 2:
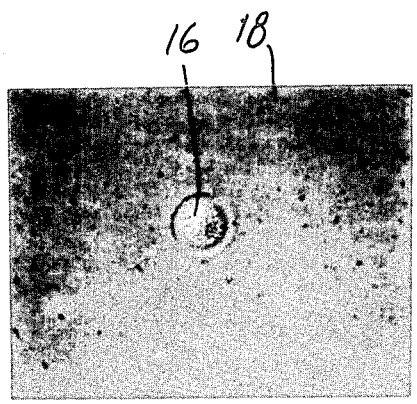
FIG. 2 is an enlarged photomicrograph of an individual recording spot of FIG. 1.

FIG. 2 shows a photomicrograph of a single image deformed spot 16 in polymeric dye layer 18 magnified 1000 times. The dot was formed with 0.2 ns (nanosecond) exposure to 17 mW (milliwatts).

Figure 3:
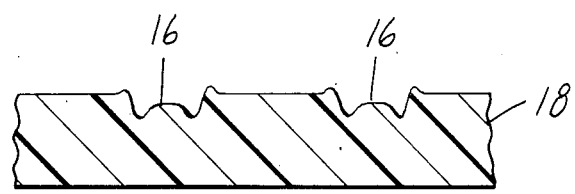
FIG. 3 is an enlarged cross-sectional view of two recorded spots.

FIG. 3 is an enlarged cross-sectional view of polymeric dye layer 18 exhibiting localized thermoplastic deformed spots 16 useful as recording spots and shown in the detail of the microphotograph of FIG. 2.

Figure 4:
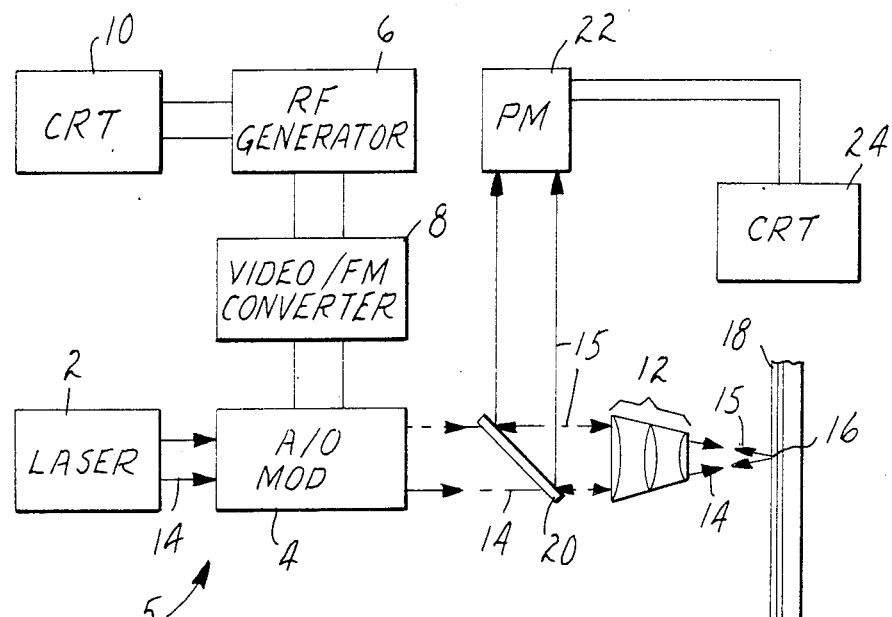
FIG. 4 is a representation of recording equipment useful in the practice of the invention.

As shown in the drawing, FIG. 4 is a schematic representation of recording equipment 5 useful in the present invention. Laser 2, a source of collimated and monochromatic light of wavelengths selected so as to be absorbed by polymeric dye layer 18, is incident on acousto-optic modulator 4 driven by RF generator 6 through video/FM converter 8. The signal from RF/generator 6 is monitored on cathode ray tube 10. After passing through acousto-optic modulator 4 beam 14 impinges on microscope objective 12 which focuses beam 14 on polymeric dye layer 18 which is on a rotating table (not shown). Some of beam 14 is reflected by polymeric dye layer 18 so as to form reflected beam 15 which is collected by microscope objective 12 which collimates beam 15 onto partially silvered mirror 20. Part of beam 14 is absorbed by layer 18 to form thermoplastically deformed spot 16. Back reflected beam 15 is diverted by mirror 20 into photomultiplier 22. The signal received by photomultiplier 22 is displayed on cathode ray tube 24. Part of beam 14 is absorbed by polymeric dye layer 18 and causes local heating of layer 18 and thereby produces thermoplastic deformation in local areas of layer 18.

Figure 5:
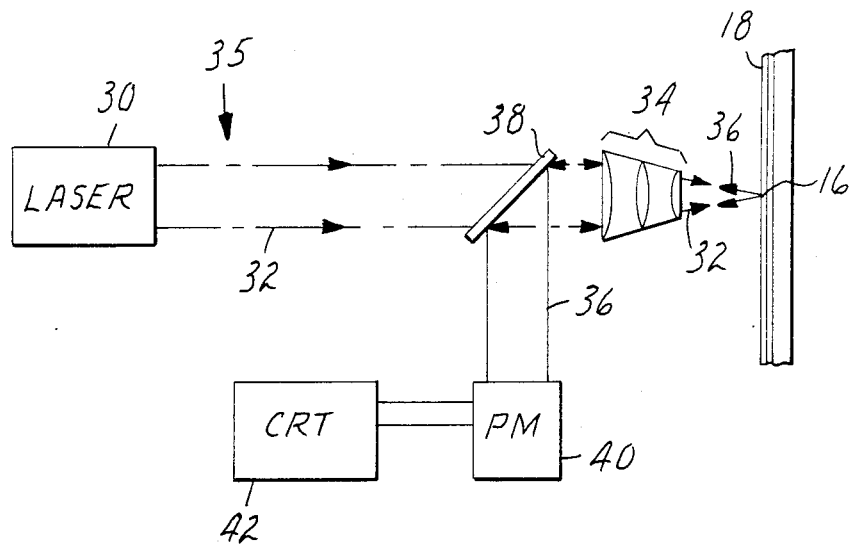
FIG. 5 is a representation of a laser reader useful in the practice of the present invention.

FIG. 5 is a schematic drawing of reading equipment 35 for the records made by the recording equipment of FIG. 4. Laser 30 provides a collimated beam of monochromatic light 32 having a wavelength which may be the same or different than the recording wavelength (as is discussed below). Beam 32 is focused by microscope objective 34 onto polymeric dye layer 18 which has undergone localized thermoplastic deformation due to information recording. Part of beam 32 is reflected by polymeric layer 18 so as to form back-reflected beam 36 which impinges upon microscope objective 34 by which it is collimated. Collimated beam 36 is incident upon partially-silvered mirror 38 which diverts beam 36 into photomultiplier 40. The signal produced by photomultiplier 40 is displayed on cathode ray tube 42. When thermoplastically deformed recording spot 16 passes through the focus of microscope objective 34 a change in back-reflected beam 36 occurs which is detected by photomultiplier 40 and displayed on cathode ray tube 42.

Figure 6:
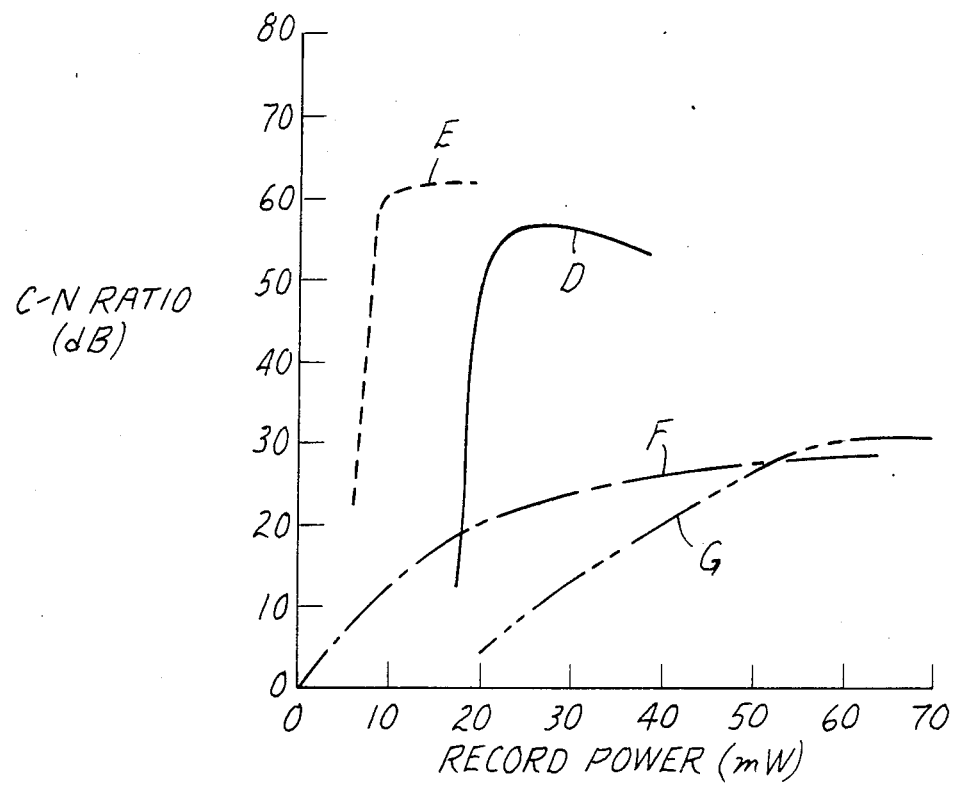
FIG. 6 is a graph showing the carrier to noise ratio (C/N) versus recording power for various constructions of recording elements (see Example 9).

FIG. 6 is discussed below in Example 9.

DETAILED DESCRIPTION OF THE INVENTION

The recording element of the present invention is useful for high-quality high information-density recordings by thermally deforming the recording layer with a writing beam, such as a laser beam, which is pulsed in a manner corresponding to the information being recorded. There is continuous relative motion between the surface of the recording layer and the writing beam. The rate of this relative motion (scanning speed) varies, and the recording beam power and diameter also vary. The peak power delivered to the surface of the recording layer is from 1 to 150 milliwatts, preferably 2 to 25 milliwatts in the examples provided below but is not limited to that range. The beam diameter also varies widely, being in the range of 0.5 to 50 micrometers or more, preferably about 1.0 micrometer or less as in the examples, but it is optionally larger or smaller, depending on the size of the deformation desired. The scanning speed also varies. In the examples, the scanning speeds used resulted in 45 to 55 nanosecond exposures per recorded bit of information.

The information optionally is read back by the use of the recording beam, with its power, of course, reduced sufficiently so as not to cause any further thermal deformation. The high-absorption-factor layers described herein provide for high-quality recordings even using a read beam which is absorbed by the recording layer. However, the reading beam alternatively can be chosen so that it is not absorbed to any significant extent by the polymeric dye layer. Thus, the reading beam optionally can be of a much higher power than would be the case if the read beam were absorbed by the layer. Where the power of the reading beam is high, the signal-to-noise ratio of the playback is also high, usually well above 45 decibels and in many cases above 55 decibels. Schlieren optics are useful during reading but are not a requirement. Reading is preferably accomplished by establishing continuous relative motion between the surface of the recorded layer of the information record and a continuous reading beam. The reading beam cooperates with a detector which detects the spacings between deformations.

In testing the materials of this invention, exposures may be made in the static mode (normally initial tests) or in the dynamic mode as described above. In the static mode, the focused laser beam is stationary on the polymeric dye layer surface with the spot sizes between 1 and 10 micrometers. Exposure times of a few tenths of a millisecond with beam powers of 1 or 2 milliwatts are common in these tests. The resulting image spots are examined under the microscope to determine the exposure conditions under which suitable deformation of the layer occurs.

In the dynamic test mode, conditions much closer to normal recording are simulated. Not only is it required to know the sensitivity of the layer to the exposing radiation but it is also important to determine the information carrying capacity. A method generally accepted in the art for determining both sensitivity and information carrying capacity measures the carrier-to-noise ratio as a function of the peak optical recording power incident on the layer. For the results presented for this invention, flux from a 514.5 nm argon laser was square wave modulated at 10 MHz giving 50 ns pulses. As shown in FIG. 4 the laser beam was focused down to a spot diameter of 0.82 micrometers measured across a diameter between points having light intensities 1/e of the central peak intensity. Spiral tracks were recorded on a disk carrying the polymeric dye layer and spinning at between 1500 and 1560 r.p.m. at typical radii in the region of 15 cm. Read-out was accomplished by using a d.c. read beam (either 514.5 nm or 633 nm) as shown in FIG. 5 directed through the recording lens in a manner such that the read power on the media surface was 2.5 mW. The playback signal was detected, amplified, and directed into a Hewlett-Packard Model 8568A Spectrum Analyzer. The ratio of the 10 MHz carrier amplitude to the surrounding noise level in a 30 KHz bandwidth yielded the carrier to noise (C/N) value in dB (decibels).

Such results are illustrated in FIG. 6 and described in detail in Example 9 where the carrier-to-noise ratio (C/N) is plotted as a function of the incident recording beam power. The requirements for a good recording medium are that the C/N values should reach high values (e.g. greater than 50 dB) for recording powers as low as possible. It is important in distinguishing image areas from non-image areas that the onset of detectable recording with increasing recording beam power should be as sharp as possible—this is often termed "exhibiting a threshold effect". The best of the inorganic recording media show the threshold effect, but dye-in-binder systems tend not to do so. It is therefore surprising and of considerable practical importance that polymeric dye layers can show the threshold effect in as pronounced a form as the inorganic media. Background to these measurement techniques and indication of their acceptance in the art may be found in the Proceedings of the SPIE Vol. 329 which presents papers from a conference at Los Angeles, Calif., Jan. 16-28, 1982 entitled "Optical Disk Technology". Of particular interest here is a paper by R. P. Freese et al beginning on page 174 of that volume.

The image dots resulting from the exposing procedures described above may be erased by scanning that area of the recording material with a laser beam held at a constant intensity sufficient to give thermoplastic effects in the recording layer. A set of new image dots may then be exposed on the area erased where the earlier image dots had been located. This process may be repeated many times so as to allow the reuse of the recording medium. The image dots shown in FIG. 1 were tenth generation recordings on that particular recording layer. After 10 successive recordings there was no perceptible loss in light absorption or thermoplastic properties of the medium.

The optical recording media of this invention comprise a supporting substrate on which is optionally coated a reflective layer, followed by a thin layer of the chosen polymeric dye or a mixture of it with a non-chromophoric polymer. When a reflective layer is present, the construction can be referred to as a bilayer. A trilayer assembly means a substrate with a coated reflecting layer on which is a transparent dielectric layer and then an absorbing dye layer, the thicknesses being chosen to give optimum absorption and minimum reflection of incident light.

The substrate or support is optionally rigid or flexible and transparent or reflective, depending upon the way it is to be used. The support is any of a virtually unlimited number of materials, for example, glass plate, glass plate coated with a 1000 Å thick reflective layer of, for example, aluminum, gold or chromium, a resin film or plate such as poly(ethyleneterephthalate) or poly(cellulose acetate), paper, clay, wood or metal), to name a few among many. Important characteristics of the support are that it be thermally stable to or thermally insulated from the temperatures created in the recording layer (to avoid deformation during recording and erasing) and that it have a very smooth surface to minimize noise which may necessitate coating a subbing layer. These requirements are treated in a paper by A. E. Bell et al RCA Review, 40, 345-363 (1979). The support should also be capable of being coated with a layer of polymeric dye, with good adhesion and no significant chemical reactivity between the layer and the support.

The support is optionally coated with other layers, as is known in the art. For example, prior to coating the recording layer, the surface of the support may be coated with a spacer layer which is substantially transparent to both write and read wavelengths. Such a spacer layer preferably has a refractive index which creates an interface of low dielectric contrast with the recording layer. The use of such a spacer layer is described by A. E. Bell and F. W. Spong, IEEE Journal of Quantum Electronics, July, 1978, page 487.

The polymeric dye layer may be of thickness from 0.03 to 30 micrometers but is preferably less than 1 micrometer thick and more preferably less than 0.2 micrometer thick in order to ensure high resolution in the records. To ensure sufficient absorption of the exposing light with such thin layers, the layer should have an absorption coefficient greater than or equal to $10^3$ $cm^{-1}$ in the wavelength region of interest and preferably the absorption coefficient should be at least $10^4$ $cm^{-1}$. Multilayer interference effects as discussed in A. E. Bell et al., supra may be used to enhance the absorption of the polymeric dye layer.

The polymeric dye or its mixture with a non-chromophoric polymer should exhibit good film forming properties so that a coated layer with a very smooth surface and high clarity can be obtained. Thermoplastic qualities are imperative with a $T_G$ preferably between about 40° and 250° C.

Non-chromophoric binders for mixing with the polymeric dyes of this invention should form compatible mixtures with the polymeric dyes. They should be miscible preferably at a molecular level and preferably should have a refractive index close to that of the particular polymeric dye involved. Solubility of both the non-chromophoric polymer and the polymeric dye in a single suitable solvent is important and they should have similar $T_g$ values in the range of 40°-250° C. Frequently polymers based on the same backbone as that present in the particular dye will show good compatibility but other types of polymers or resins may also do so. Useful binders include cellulose acetate butyrate, polystyrene, polysulfonamide, polycarbonates (e.g. those commercially available from General Electrics Plastics under the trade name Lexan ™), cellulose nitrate, hydroabietyl alcohol (e.g. that commercially available from Hercules Chemical Company under the trade name Abitol ™ AUK257), polyacrylates [poly(ethyl methacrylate), poly(methyl methacrylate)], poly(vinyl butyral), poly(vinyl acetate) and Stabelite ™ Ester 10, a hydrogenated rosin ester commercially available from Hercules Chemical Company. These binders may be used either singly or in combination with another.

It is generally preferred that the recording layer be an amorphous material since pronounced crystallization, graininess, or micelle formation in the film may cause light scattering and increased noise levels making the material unsuitable as a high quality recording medium.

The solvent coating of the polymeric dye layer may be carried out by any of the known techniques including bar-coating, dip-coating, spray-coating, knife-edge-coating and spin-coating. Solvents used are chosen to suit the particular polymeric dye or its mixture with a non-chromophoric polymer and the requirements of the coating technique. They include, for example, tetrahydrofuran, cyclohexanone, and other ketonic solvents, and chlorinated solvents.

It is also envisioned within the present invention to add various addenda such as coating agents (e.g., wetting agents, spreading agents) to the coatable medium.

It is preferred that the polymeric dyes are neither water miscible nor water absorbing because that type of dye layer will normally be adversely affected by atmospheric humidity changes. The dyes preferably will absorb less than 5% by weight of moisture in one month at 25° C. and 70% relative humidity.

The choice of laser for the exposing source (e.g., Ar laser, He-Ne laser, laser diodes emitting near infra red, etc) is dependent on many instrumental and other factors not related to the construction of the recording medium. It is therefore important to be able to choose the wavelength of peak absorption of the absorbing material in a wide range of wavelengths. By suitable choice of the chromophores in the present invention, the range covered can be from 300 nm to 1000 nm. It is possible to have more than one absorption peak either by choice of the chromophore or by polymerization using more than one type of chromophore.

The concentration of chromophores in the polymeric dye should be as high as possible in order to attain high absorption coefficients and thus meet the requirement for very thin layers. The polymerization of chromophoric monomers alone is not preferred because the physical properties of the layer may not be suitable. Thus the non-chromophoric monomers are used in the copolymers to assist in the provision of the required physical properties such as film-forming, non-crystallinity, $T_G$, solvent solubility, adhesion to substrate, etc. In some cases however it may be possible to produce satisfactory physical properties from chromophoric monomers alone.

It is preferable that the chromophore chosen should have a high molar extinction coefficient so that the absorption coefficient of the layer is not unduly limited by the need to copolymerize with non-chromophoric monomers.

Although with normal molecular chromophores it is common to describe their light absorbing efficiency by the molar extinction coefficient, it is neither satisfactory nor reliable to use this measure with polymeric materials. A useful measure of the absorption of polymeric dyes in bulk is given by the absorptivity, a $Lg^{-1} cm^{-1}$ where a is expressed in terms of the transmission factor T of a solution of concentration C g/L and thickness d cm. is given by $a = -(\ln T)/d.c$).

The polymeric dyes of this invention should be substantially linear in their form. No substantial cross-linking should be present between the chains which could interfer with their solubility, film forming properties, and thermoplastic properties. The acceptable range of polymer chain lengths is also determined by the resultant physical properties, but chains containing 5 chromophore units upwards to about 10,000, and even up to 100,000, chromophore units will be useful. The molecular weight range can be from about 500 to about 10,000,000 but a preferred range is from about 5000 to about 100,000. The most preferred range is from 7,000 to 30,000. The preferred chromophore (dye groups) content is in the range of 40 to 100 mol percent.

There is disclosed in the art a wide range of chromophores incorporated into linear polymeric forms. Amongst these chromophores are azo, anthraquinones, triarylmethane, cyanine, styryl, phthalocyanine, phenazine, thiazine, oxazine, xanthene, acridene, quinoline, stilbene, thiazole, indamine, indophenol, lactone, aminoketone, hydroxyketone, and indiazoid dyes. For the purposes of this invention many of these will be suitable based upon the requirements disclosed above.

Preferred polymeric dyes for the practice of this invention fall into three classes, (A) condensation polymers (B) copolymerized ethylenically unsaturated monomers (C) polymeric cyanine dyes, as follows:

[A] This class comprises polymeric dyes having units of the general formula

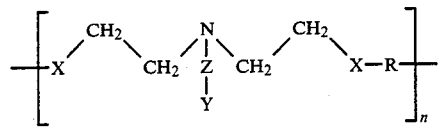

wherein n is an integer preferably from 5 to 10,000, but may be considerably higher, e.g. 5 to 100,000, which are formed as condensation polymers of diacid, dihaloformate, or diisocyanate having formula I below, and dihydroxy compounds with pendant arylamine groups having the formula II below; compounds of formulae I can be

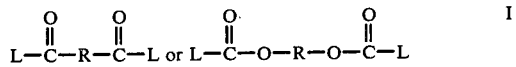

or OCN—R—NCO
where
L can be —Cl or —Br, and
R can be an aliphatic (straight-chain, branched, or cyclic) or aromatic (single or fused ring) hydrocarbon with up to 30 carbon atoms; compounds of formula II can be

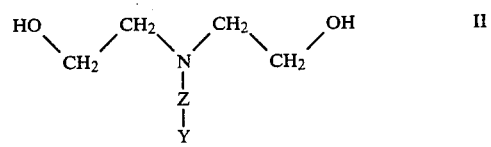

where

Z is a linking group which can be a substituted or unsubstituted phenylene or naphthylene group wherein the substitution groups are —Br, —F, —OH, alkyl, alkoxy, alkylamino, dialkylamino, —NH$_2$, —NO$_2$, phenyl, carbamoyl, —CN, carbalkoxy

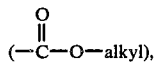

sulfonyl, sulfamyl, and sulfamido,

Y completes a chromophore chosen from classes (1) to (4) below, and

X can be condensation residues

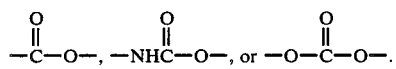

Chromophores and linking groups represented by Z-Y include:
(1) Azo groups wherein Z is as defined above and Y=—N=N—D or —N=N—G—N=N—D and D can be an aromatic nucleus of 1 to 5 rings (fused or connected by single bonds), or a heterocyclic ring of 4, 5, or 6 members containing one to four or more atoms of N, S, and non-peroxidic —O— atoms optionally bearing one or more auxochromic groups as substituents chosen from groups such as —Cl, —Br, —F, —OH, alkyl (C$_1$-C$_6$), alkoxy, alkylamino, dialkylamino, —NH$_2$, —NO$_2$, carbamoyl, —CN,

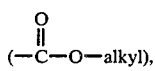

carbalkoxy, sulfonyl, sulfamoyl, and sulfamido and G is phenylene or naphthylene group;
(2) Tricyanovinyl groups wherein
Z can be as defined above, and

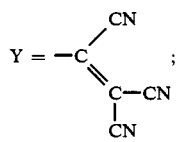

(3) Anthraquinone groups where Z can be as defined above or can be a single bond, and

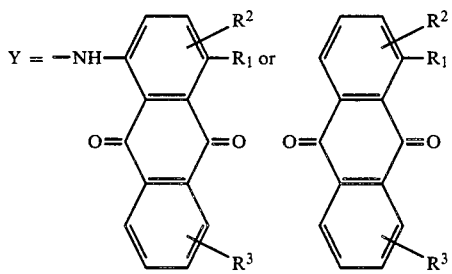

where R$^1$ can be —OH, —NH$_2$, alkylamine, dialkylamino, or arylamino where aryl is phenyl or phenyl substituted by auxochromic groups as defined for use on D in (1) above, R$^2$ and R$^3$ independently can be auxochromic groups as defined for use on D in (1) above.
(4) Methine dyes where Z is defined above as in class [A]1), and
Y can be

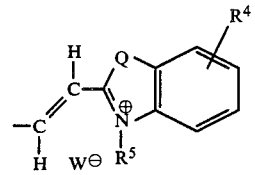

in which Q can be

—S—, —Se—, or —O—,
R$^4$ can be an auxochromic group as in (1) above
R$^5$ can be alkyl (C$_1$-C$_{18}$) or an anion group as in Zwitter ionic dyes in which case W is not present.
W is a dye anion, for example, Cl$^-$, Br$^-$, I$^-$, ClO$_4^-$, CH$_3$SO$_3^-$, BF$_4^-$, PF$_6^-$, C$_2$F$_5$C$_6$H$_{10}$SO$_3^-$ and other anions commonly used with cyanine dyes.

[B] This class comprises copolymers (preferably random) derived from ethylenically-unsaturated monomers having formulas III and IV:
III—any ethylenically-unsaturated monofunctional monomer not including any chromophoric moieties, for example,

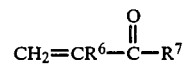

(methy)acrylamide or (meth)acrylate monomer,
CH$_2$=CH—OR$^8$   vinyl ether monomer,

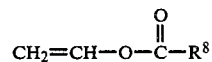

vinyl ester monomers, or
CH$_2$=CR$^6$—CN   meth(acrylonitrile monomer),
wherein R$^6$ can be —H or —CH$_3$
R$^7$ can be —OR$^8$ or —NHR$^8$
R$^8$ can be alkyl (C$_1$-C$_{18}$)
IV—chromophore-containing ethylenically-unsaturated monomers including

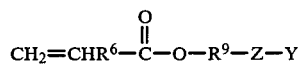

(meth)acrylate dye,

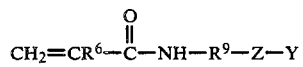

(meth)acrylamide dye,

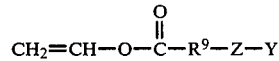

vinyl ester dye, or
CH$_2$=CH—O—R$^9$—Z—Y   vinyl ether dye,
wherein R$^6$=—H or —CH$_3$ independently of formula III monomer, Z-Y can be a linking group and chromophore as defined in classes [B](1)-(4) below similar to [A](1)-[A](4) respectively, with the additional class [B](5) below Z in [B](1)-(4) can be those radicals defined in [A](1) to (4) respectively, except in [B]5 where it is as defined in [A](3), and R$^9$ can be an organic linking group defined individually for chromophores in [B](1) to [B](5) below.

Examples of dyes in Class [B] include
(1) Azo dyes
  Z and Y can be defined as in [A](1),
  R$^9$ can a single bond or

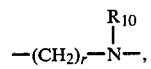

where R$^{10}$ can be —H or alkyl (C$_1$-C$_8$), and r is an integer of 1 to 6;
(2) Tricyanovinyl dyes
  Z and Y can be defined as in [A](2), and
  R$^9$ can be

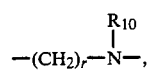

wherein R$^{10}$ and r can be as defined above;
(3) Anthraquinone dyes
  Z and Y can be defined as in [A](3)
  R$^9$ as in [B](1);
(4) Polymeric methine dyes
  Z and Y can be defined as in [A](4)
  R$^9$ as in [B](2):
(5) Indoaniline dyes
  where R$^9$ can be

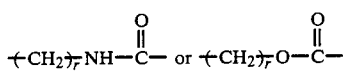

r can be an integer of 1 to 6
Z can be as defined as in [A](3), and
Y can be

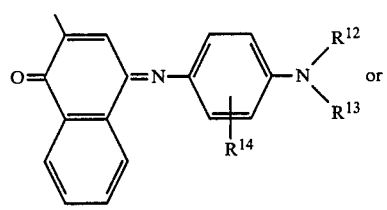

or where R$^9$=

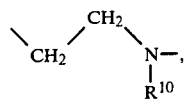

Z can be as defined above for [A](3) polymers,
R$^{10}$ is as defined above in [B](1), and
Y can be

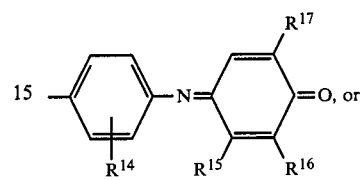

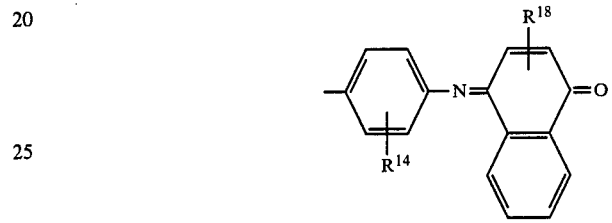

in which
R$^{14}$, R$^{15}$, R$^{16}$, and R$^{17}$ can be —H, halogen (—Cl, —Br), alkyl (C$_1$-C$_8$), or alkoxy (C$_1$-C$_8$),
R$^{12}$ and R$^{13}$ can be alkyl (C$_1$-C$_8$)
R$^{18}$ can be an auxochromic group as defined on D in [A](1) above.

Examples of the monomers [B]IV using azo dye chromophores may be found in issued patents GB 1,200,216 and GB 1,269,627, and examples of those using anthraquinone dyes are disclosed in Soc. Chim. de France Bull. page 1196 (1975).

[C] Tricarbocyanine polymeric dyes having formulas V and VI:

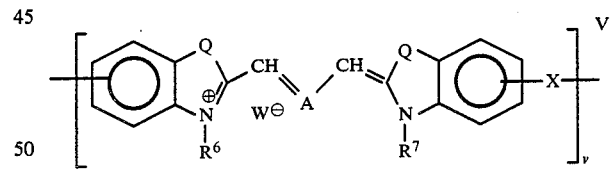

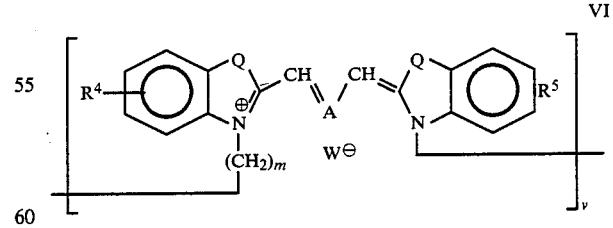

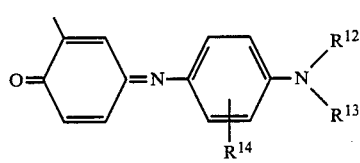

where Q can be

—C(CH$_3$)$_2$,
—S—, —Se—, or —O—,
A can be

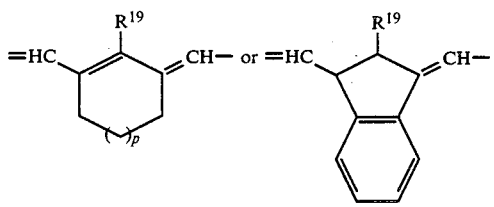

in which R$^{19}$ can be alkyl, —Cl, amine, amine substituted or alkyl (C$_1$ to C$_4$), phenyl, or cyclized amine (e.g., morphilinyl, piperidyl, pyridinyl, and piperazinyl), and p can be 0 or 1

R$^6$ and R$^7$ are independently alkyl of (C$_1$-C$_{30}$) preferably (C$_1$-C$_{18}$), R$^4$ and R$^5$ are independently H—, C$_6$H$_5$SO$_2$—, or CF$_3$SO$_2$—, X can be —SO$_2$—, (CH$_2$)$_m$, or vinyl, W can be I$^-$, Br$^-$, Cl$^-$, ClO$_4^-$, perfluoroethylcyclohexylsulfonate (PECHS), trifluoromethanesulfonate (F$_3$CSO$_3^-$), or other commonly used dye anions m is an integer of 1 to 20 v is an integer of 5 to 10,000

Preparation of dyes of formulae V and VI is accomplished by condensation of bis-heterocyclic quaternary salts of formulae VIIa and VIIb, below, with a pentamethine bridging-compound selected from formulae VIII-(a-d), below.

Bis-heterocyclic quaternary salts—VIIa and VIIb

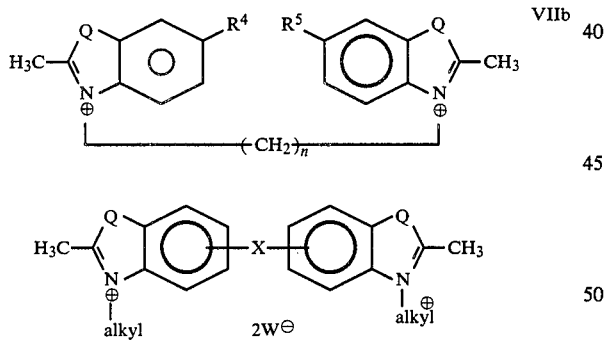

where

Q can be

—S—, —Se—, or —O—

X can be —SO$_2$—, or (CH$_2$)$_m$ where m=1 to 20, or vinyl,

R$^4$ and R$^5$ can be as defined above,

W is an anion as defined above, and alkyl can be C$_1$ or C$_{12}$.

The bis-heterocyclic intermediate of formula VIIb wherein X=—SO$_2$—, Q=

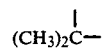

is a novel compound, the preparation of which is illustrated in EXAMPLE 1.

PENTAMETHINE Bridging Compounds VIII (for use in the preparation of dye of formula V and VI) can be, for example,

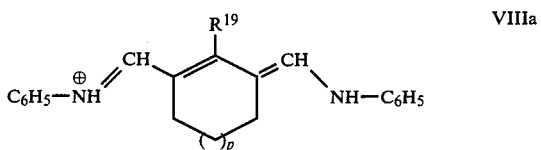

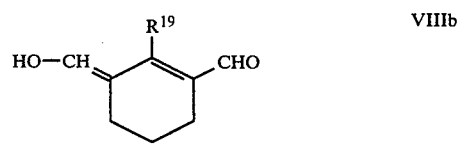

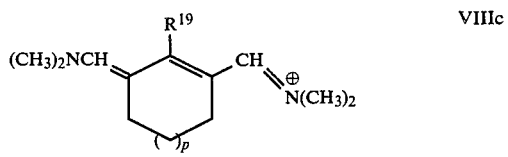

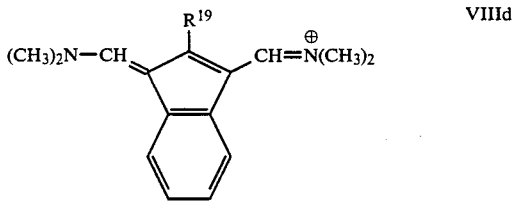

where

R$^{19}$=alkyl (C$_1$-C$_8$), Cl, amine, amine substituted by alkyl (C$_1$ to C$_4$), phenyl, or cyclized amine (e.g., morphilinyl, piperidyl, pyridinyl, and piperazinyl)

p=0 or 1 (when p=0, a 5-membered ring is represented)

Numerous pentamethine compounds such as those represented by formulae VIII(a-d) are well known and methods of their preparations are found in the literature including the following:

(i) Yu. L. Slominskii, I. D. Radchenko, and A. I. Tolmachev, Zhurnal Organicheskoi Khimii, Vol. 14, No. 10, pp. 2214-2221, Oct. 1978; Vol. 15, No. 4, pp. 865-868, April, 1979; Vol. 13, pp. 1189(1977).

(ii) S. M. Makin, I. I. Boiko, and O. A. Shavrygina, Zhurnal Organicheskoi Khimii, Vol. 13, No. 11, pp. 2440-2443 (Nov. 1977) Vol. 13, No. 6, pp, 1189-1192 (June 1977).

(iii) G. A. Reynolds and K. H. Drexhage, J. Org. Chem., Vol. 42, No. 5, 1977.

(iv) U.S. Pat. No. 4,030,932

(v) U.S. Pat. No. 3,482,978

Representative examples of tricarbocyanine dyes having formula V and VI are:

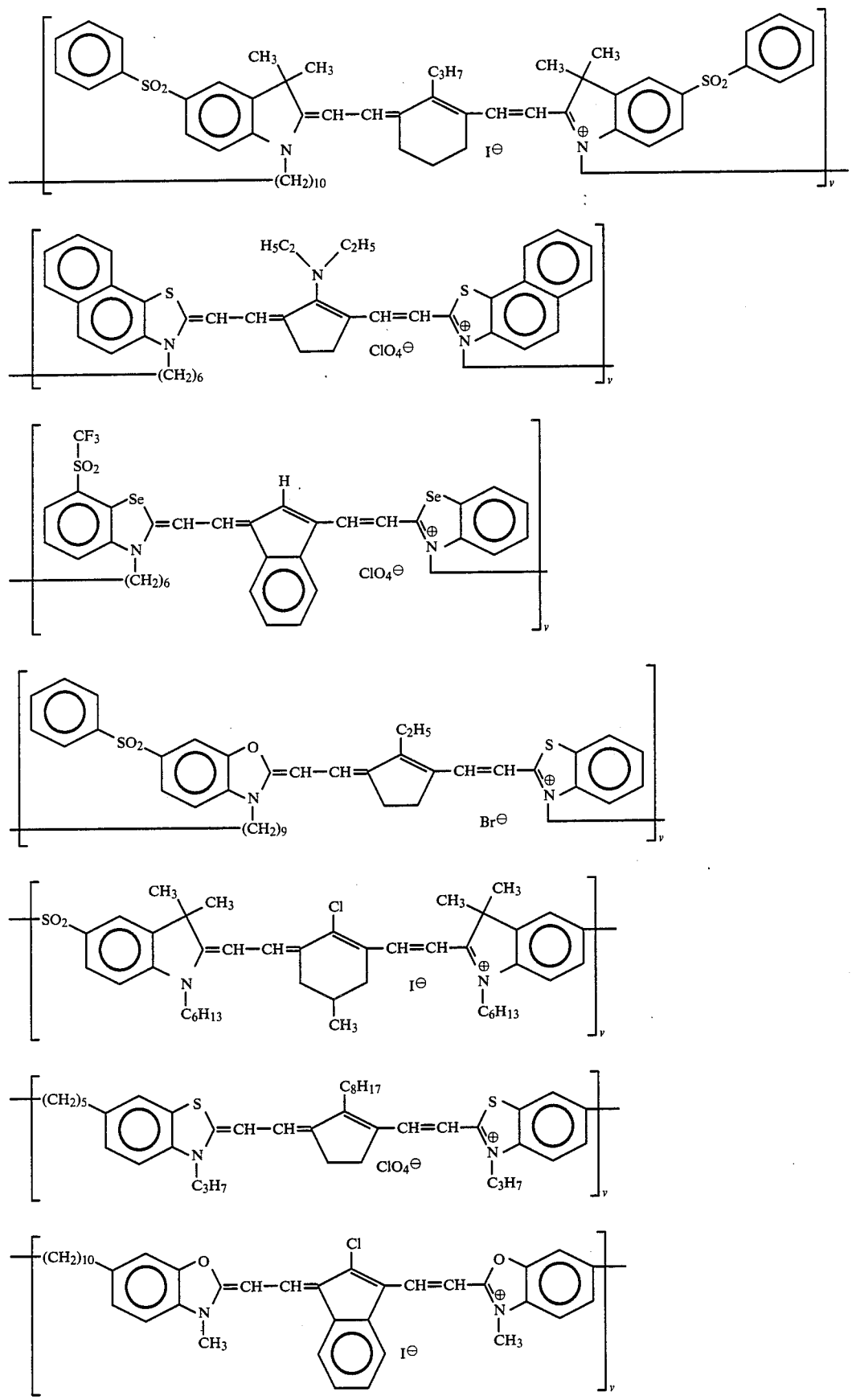

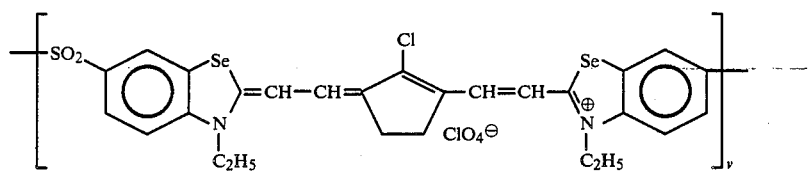
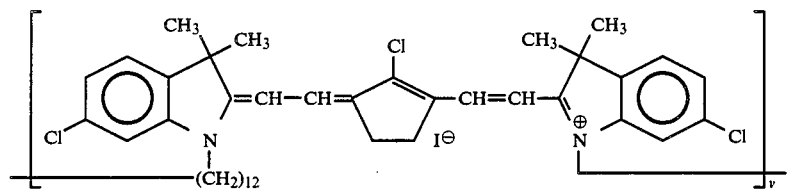
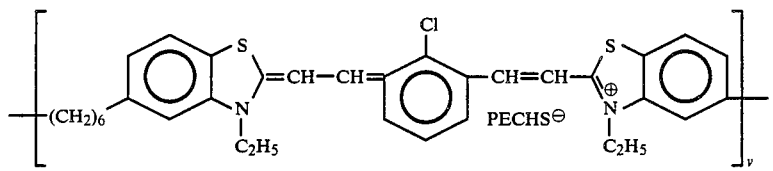
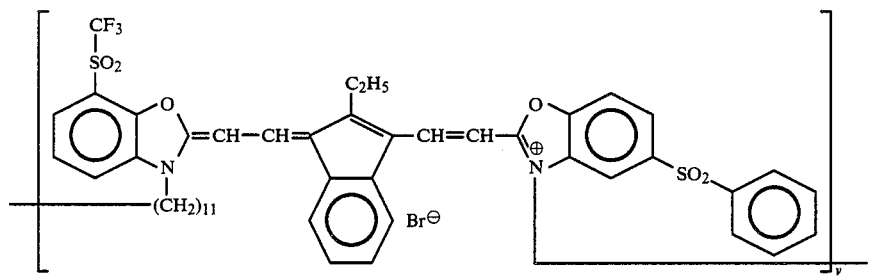
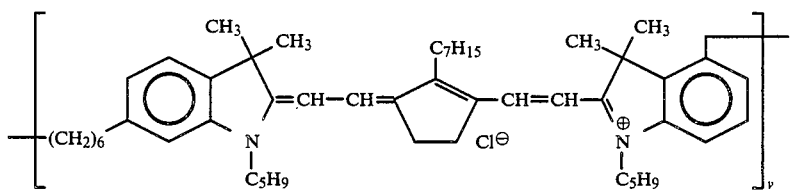
Particularly preferred examples of polymeric dyes of classes [A] and [B] are illustrated as follows:
(1) Azo dye polymer units of the class [A](1) having the formula
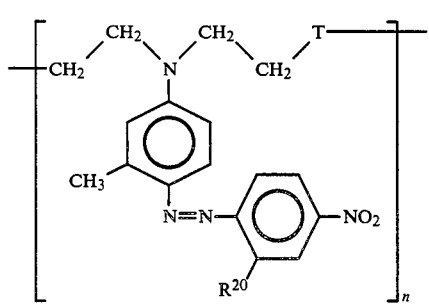
where T can be 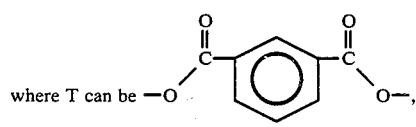
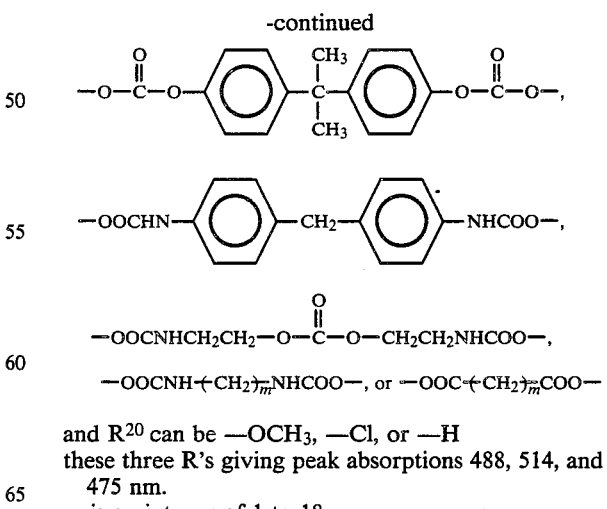
and $R^{20}$ can be —OCH$_3$, —Cl, or —H
these three R's giving peak absorptions 488, 514, and 475 nm.
m is an integer of 1 to 18,
n the number of units in the polymeric chain is in the range of 5 to 100,000 which are prepared by copolymerization of an azo dye of the formula X with the following six representative monomers (IX-a, IX-b, IX-c, IX-d, IX-e, and IX-f)

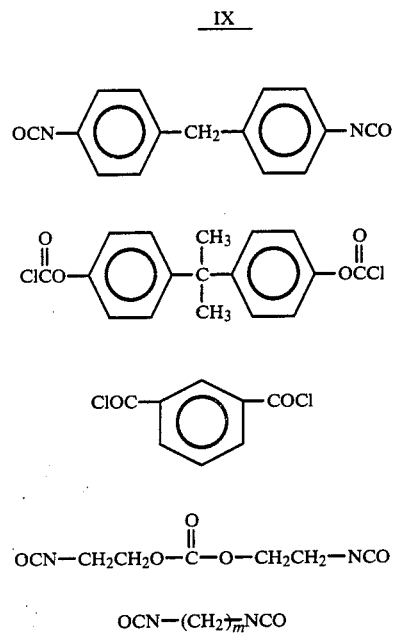

wherein m is an integer 1 to 18.

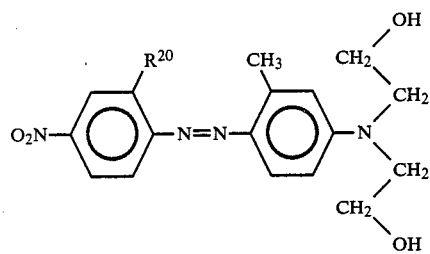

where $R^{20}$ is alkyl ($C_1$-$C_6$), alkoxy, —Cl, —Br, —OH, —$NH_2$, —$NO_2$, or —CN.

These condensation polymerizations necessarily produce alternating chains derived from monomers IX and X. Final average molecular weights are often fairly well defined at between 8,000 and 20,000. These polymeric azo dyes have good solubility in cyclohexanone and chlorinated solvents and can be spin-coated or dip-coated from a solution to give smooth, transparent, uniform films with no flaws. They absorb in the visible with an absorptivity at the peak wavelength of 50 L$g^{-1}$ $cm^{-1}$, which translates to a layer absorption coefficient of about 6–8×$10^4$ $cm^{-1}$.

(2) Tricyanovinylated polyaryliminodiethanol esters of the class [A](2)

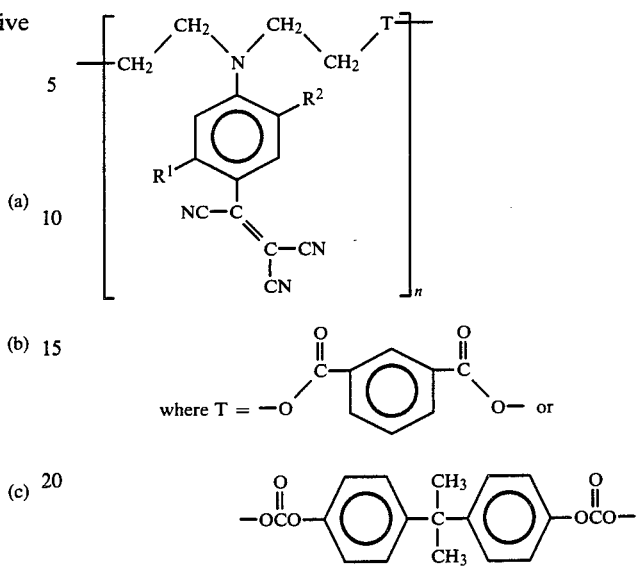

and n=5 to 10,000
For the polymers
when:
$R^1$=$R^2$=—H, λmax=492 nm
$R^2$=—H, $R^1$=—$CH_3$, λmax=513 nm
$R^1$=$R^2$=—$OCH_3$, λmax=535 nm.

The absorptivity of these polymers at λmax is 25–30 L$g^{-1}$.$cm^{-1}$. They have good solubility in chlorinated and ketonic solvents with good film-forming properties. The syntheses of these polymers were described by Sulzburg and Cotter in Macromolecules 2 (2) page 146, March/April 1969.

Although these authors did not disclose other variants on these structures we have been able to synthesize the following polymeric dyes which we believe to be novel.

New polymeric dyes of the same class above:

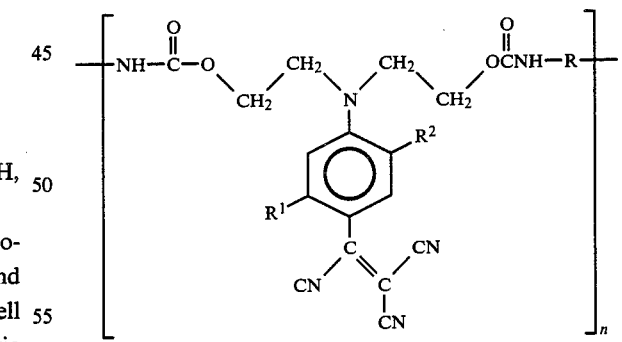

where R is any aliphatic or aromatic hydrocarbon preferably with up to 20 carbon atoms.

An Example of such polymeric dyes in which R can be

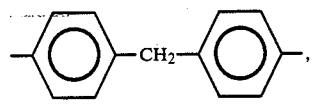

$R^1$ is —$CH_3$, and, $R^2$ is —H has λmax=519 nm in MEK

These are made by reacting a compound of the form

ONC—R—CNO with the chromophore precursor used by Sulzburg & Cotter macromolecules 2(2) page 146, March/April 1969 having the formula

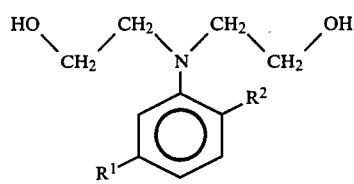

giving a polymer which is then reacted with tetracyanoethylene in dimethylformamide or pyridine at 50°–55° C. for about ½ hour to give the final polymeric dye of molecular weight in the range 15,000 to 50,000.

(3) An example of a novel anthraquinone dye of the class [A](3) of the invention has units of the formula

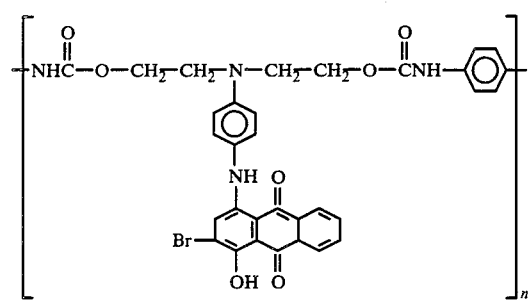

wherein n is an integer of 5 to 100,000.

(4) Novel polymeric dyes of the class [A](4) derived from styryl dyes

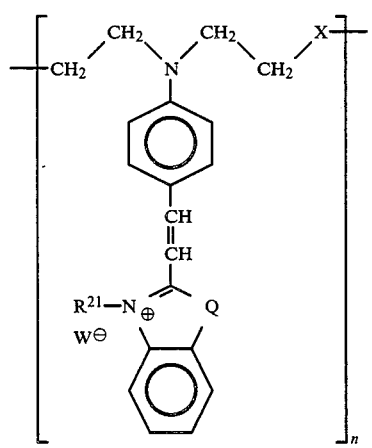

where X is a non-chromophoric group as defined above in preferred examples [A](1).

and Q can be

—S—, or —O—, $R^{21}$ can be alkyl ($C_1$–$C_{20}$), and n is an integer of 5 to 100,000.

An example wherein Q is

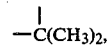

$R^4$ is ethyl, W is the anion $I^-$, and X is

gives λmax=546 nm.

This dye was prepared as shown in the scheme below:

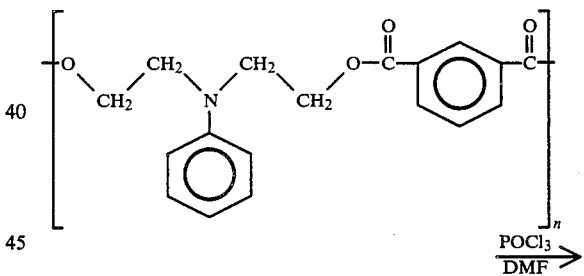

$$\xrightarrow{POCl_3}{DMF}$$

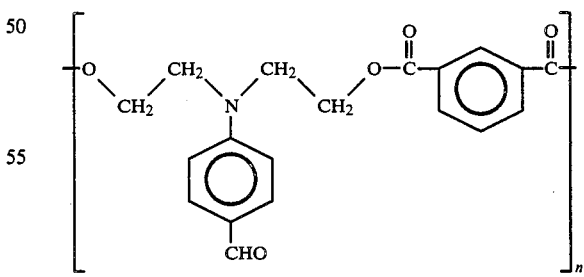

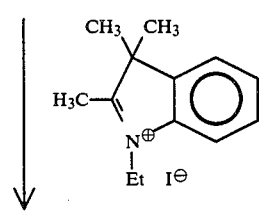

↓

-continued

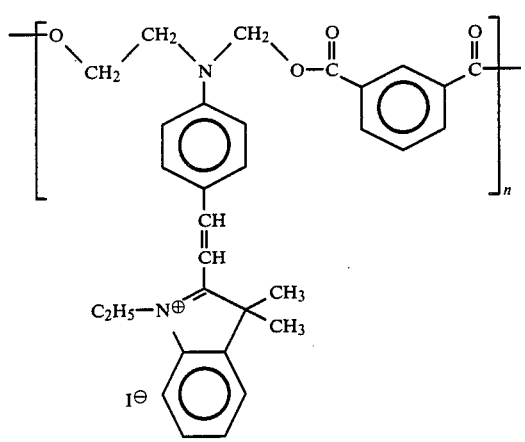

which has λmax=546 nm.

(5) An example of a novel polymeric dyes of class [B]1 can have the formula

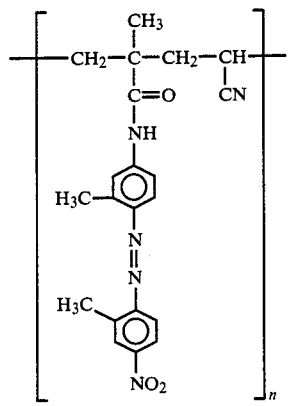

wherein n can be an integer of 5 to 100,000.

(6) Novel polymeric dyes derived from the class [B](2) can be prepared starting from the monomer

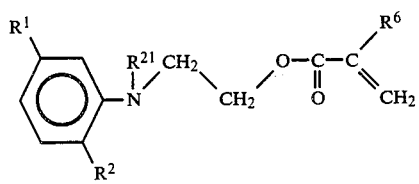

wherein
R⁶ can be —H or —CH₃,
R¹ can be alkyl,
R² is independently —CH₃, —H, or —OCH₃.

Polymerization of these ethylenically-unsaturated monomers is by standard methods well known in the art except that the addition of a chain transfer agent such as 1-dodecanemercaptan is needed to prevent crosslinking through the reactive hydrogen on the methylene group next to the imide nitrogen. Tricyanovinylation of the obtained polymer may be accomplished by reaction with tetracyanoethylene in dimethylformamide or pyridine at 50°–55° C. for about ½ hour, and can be used, for example, to prepare the following terpolymer:

EXAMPLE

Terpolymer

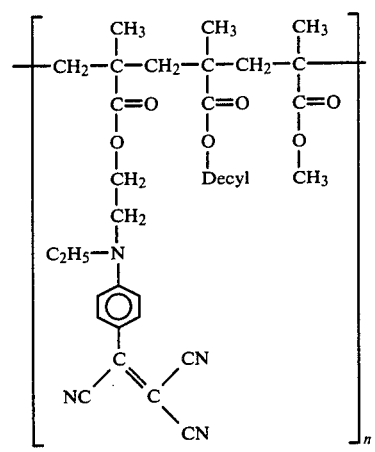

wherein n is an integer of 5 to 100,000,
λmax=505 nm (film)
and=510 nm (CHCl₃)
in which the three pendent chains are disposed at random along the backbone.

(7) An example of a polymeric dye of class [B](3) can have the formula

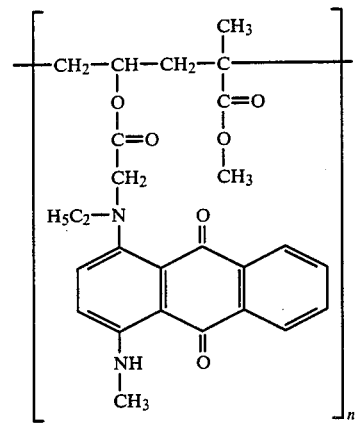

wherein n can be an integer of 5 to 100,000.

(8) An example of a polymeric dye of class [B](4) can have the formula

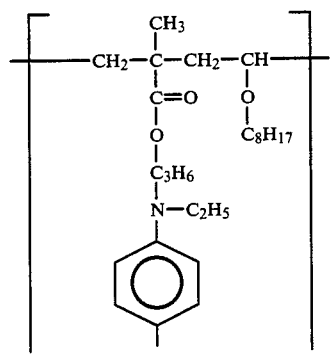

-continued

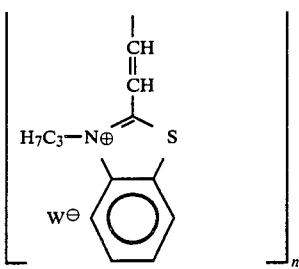

wherein
n can be an integer of 5 to 100,000, and
W is a dye anion.

Polymerization of these ethylenically-unsaturated monomers is as described above for novel class [B](2) polymers.

(9) Novel polymeric dyes derived from indoaniline class [B](5) having the formula

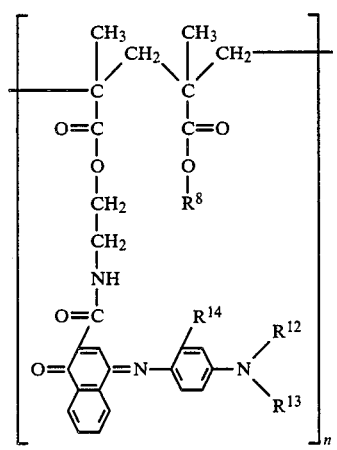

wherein
$R^{12}$, $R^{13}$, $R^{14}$ can independently be alkyl ($C_1$-$C_6$), n can be an integer of 5 to 10,000, and
$R^8$ can be alkyl ($C_1$-$C_8$),
and in which the two pendent chains are disposed randomly along the backbone.

A sample of this class (in n-butyl acetate) wherein $R^8$ is —$CH_3$, $R^{12}$ is —$C_2H_5$, $R^{13}$ is —$C_2H_5$, and $R^{14}$ is —$CH_3$ has λmax=654.5 nm.

GENERAL PREPARATION PROCEDURES

I. Polyazo dyes of Class [A]

(a) Polyester or polycarbonate copolymers

A mixture of 0.01 mole of the arylazophenyliminodiethanol dye, 0.01 mole of aryldiacid chloride or aryldichloroformate, 40 mL of 1,2-dichloroethane, and 3 mL (0.038 mole) of pyridine was refluxed for one hour, then cooled, coagulated in 300 mL of ethanol in a home blender, and filtered off. The polymeric dye was returned to the blender, blended twice with water, and dried.

(b) Polyurethane copolymer

A solution of 0.1 mole of the arylazophenyliminodiethanol dye in 40 mL of dry dimethylsulfoxide was added all at once to a solution of 0.1 mole of diisocyanate in 40 mL of cyclohexanone. The reaction mixture was heated while stirring for three hours at 115° C., cooled, and the polymeric dye extracted as in I(a) above.

II. Poly(meth)acrylate dyes of Class [B]

(a) A mixture of two component monomers in any relative amounts (i) the azo or anthraquinone dye (meth)acrylate monomer as disclosed in UK No. 1,200,216, or methine or indoaniline dye monomers, or N-alkyl-N(meth)acryloyloxyethyl-aniline(toluidine)

(ii) (Meth)acrylate with 1 weight percent 1-dodecane mercaptan and 1 weight percent of azobisisobutylnitrile (percent related to total monomers) in toluene was heated to 79° C.±1° C. for 5 hours. When a dye (meth)acrylate is used the resulting solution of polymeric dye in toluene may be coated as it is or may be extracted as in I(a) above. Tricyanovinyl groups may be attached to the polymers containing the non-chromophore groups in (ii), by the method (b) below.

(b) Tricyanovinylation of the non-chromophoric polymers prepared in I(a), I(b), or II(a) may be accomplished by reacting them with tetracyanoethylene in dimethyl formamide at 50°-55° C. for ½ hour.

Objects and advantages of this invention are further illustrated by the following examples, but the particular materials and amounts thereof recited in these examples, as well as other conditions and details, should not be construed to unduly limit this invention. All polymeric dye layers in the Examples below and in the preparative Examples above have absorption coefficients of at least $10^3$ cm$^{-1}$.

EXAMPLES

Example 1

Preparation of intermediate for polymeric dye of Class (C) 5,5'-bis-(1-ethyl-2,3,3 trimethyl-indolinium iodide) sulfone (VII-b) (Z=—$SO_2$—, Y=($CH_3$)$_2$C—, W=I⁻).

Part (A) bis(4-hydrazinophenyl)sulfone

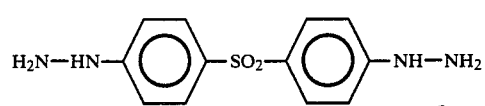

220 mL of 65 weight percent hydrazine hydrate was added drop-wise in a heated mixture of 57.4 g (0.2 mole) of bis-(4-chlorophenyl)sulfone and 220 mL 2-methoxyethanol at 70° C. After the addition is finished, the temperature of the reaction-mixture was raised to 115° C. and maintained for 24 hours, then filtered to remove dark greenish impurities. The filtrate was diluted with 300 mL water and cooled. A white solid product was collected on a filter and it was washed with cold water to yield 40.0 g of white powder melting at 179°-183° C. with decomposition.

Part (B) 5,5'-bis(2,3,3-trimethylindolenine)sulfone

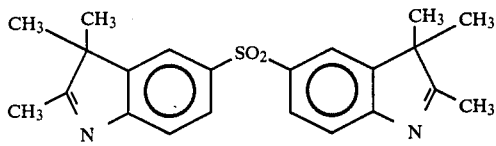

39.00 g of the hydrazine compound was refluxed with 300 mL of methylisopropylketone until all water has been removed (approx. 7 hrs.). Then the excess ketone was removed by distillation under reduced pressure. The residue was an orange-red, heavy liquid (59–60 g). The crude hydrazine [bis-(4-methylisopropyl-hydrazonephenyl)sulfone] was dissolved in 120 mL of anhydrous ethanol and heated to 70° C. Then, 190.00 g of $ZnCl_2$ was added portion-wise and the reaction-mixture was kept under $N_2$ for 24 hours. It was poured onto 350 mL ice water containing 16 mL conc. HCl, then blended in a home blender and the yellow-orange powder was collected on a filter (yield, 66.2 g of dry solid). The $ZnCl_2$ salt was refluxed with a mixture of 300 mL $CHCl_3$ and 300 mL of 20 weight percent KOH for ½ hour. The organic layer was separated, washed with water and dried over anhydrous $MgSO_4$. After the removal of $CHCl_3$ under reduced pressure an orange solid was obtained and was crystallized from ethyl acetate/petroleum ether (1:5).

Yield: 22.1 g, melting at 217°–218° C.

Elemental analysis confirmed the product to be 5,5'-bis(2,3,3-trimethylindolenine)sulfone.

Part (C) the bis-quaternary salt

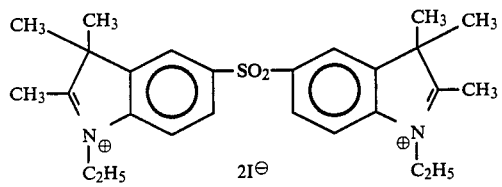

8.5 g (0.025 mol) of 5,5'bis-(2,3,3-trimethylindolenine)sulfone and 15 mL of ethyliodide were placed in a sealed stainless steel bomb and heated together in an oil bath at 110° C. for 20 hours. The cooled reaction mixture was ground in a mortar and washed with several portions of ether, and then with ethylacetate.

Yield: 8.00 g of a solid, melting at 150° C.

Elemental analysis confirmed the product as the bis-quaternary salt of the part (B) compound.

EXAMPLE 2

Preparation of the intermediate for polymeric dye of Class [C]VI, 1,1'-pentamethylene bis-(2,3,3-trimethyl indolenine iodide)-VIIIa (R=H, Y=

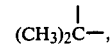

W=$I^-$) 15.00 g (0.1 mole) of 2,3,3-trimethylindolenine and 15 g (0.046 mol) of 1,5-diiodopentane were placed in a sealed stainless steel bomb and heated together in an oil bath at 110° C. for 20 hours. The resulting cake was ground in a mortar with acetone. The solid was collected on a filter and washed with more acetone.

Yield: 20.00 g of tan solid, melting at 242°–244° C. (67.5% yield).

EXAMPLE 3

Preparation of polymeric cyanine dyes of class [C].

A mixture of 5 mmoles of the bis-heterocyclic quaternary salt of Example 1, Part (C), 5 mmoles of 2-chlor-1-formyl-3-hydroxymethylenecyclohexane (VIII-b), 5 mmoles of sodium acetate, 30 mL acetic anhydride and 15 mL acetic acid was refluxed for 15 min., and then chilled. The resulting solid was precipitated by ether, collected on a filter, washed with water and then alcohol; then purified with 2-methoxyethanol. Using this method with other bis-heterocyclic quaternary salts dyes represented by formulae VII & VIII were made.

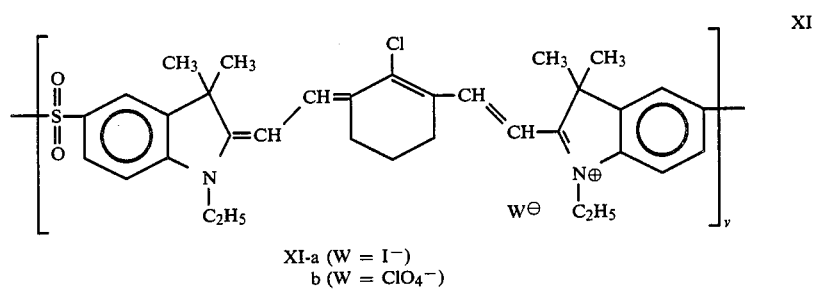

XI-a (W = $I^-$)
b (W = $ClO_4^-$)

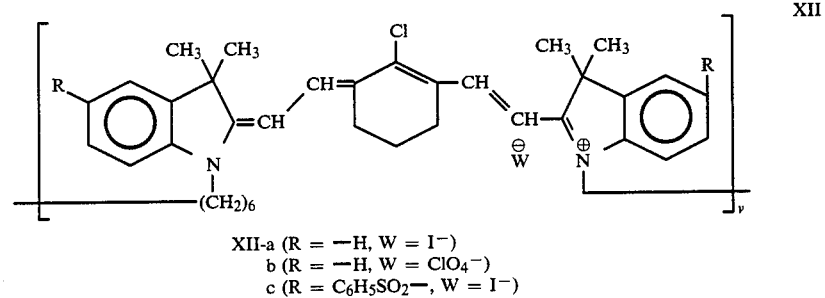

XII-a (R = —H, W = $I^-$)
b (R = —H, W = $ClO_4^-$)
c (R = $C_6H_5SO_2$—, W = $I^-$)
d (R = $C_6H_5SO_2$—, W = $ClO_4^-$)

TABLE I

The characteristics of the polymeric tricarbcyanine dyes

| Compound | λmax (nm) in solution | λmax (nm) in a thin film | absorptivity Lg$^{-1}$cm$^{-1}$ | decomposition temp. °C. |
|---|---|---|---|---|
| VIII-a | 800-acetonitrile | 818 | 106 | 222 |
| VIII-b | 810-CH$_2$Cl$_2$ | 840 | 187 | 255–263 |
| VIII-a | 720, 790-acetonitrile | 822 | 129 | 214 |
| VIII-d | 808-CH$_2$Cl$_2$ | 812 | 129 | 228–234 |

EXAMPLE 4

Tests of the optical recording capability of polymeric azo dyes of general formula (A) were carried out initially with static laser exposures.

Samples of dyes were dip-coated on 1"×3" microscope slides from an 8 weight % solution in cyclohexanone giving relatively thick (1 micrometer) coatings followed by air-drying. Five samples were prepared.

| Sample # | Constitution |
|---|---|
| 1 | copolymer of (IX)a) and (X) |
| 2 | copolymer of (IX)c) and (X) |
| 3 | terpolymer of ((IX)c)/(X)/s, wherein s = m-tolyl-imidodiethanol)-2:1:1 |
| 4 | poly(phenyliminodiethanol/iso phthalate)-50% tricyanovinylated |
| 5 | copolymer of IXd and X |

The light pulse energy needed for recording dots on a solvent coated layer of a polymeric dye was tested on a static tester in which a pulsed laser beam, wavelength 488 nm, was focused by a 0.65 NA microscope objective onto the surface of the material. Column 3 of TABLE II below shows the energy level needed for each of the samples to record dots just detectable under the microscope.

For erasure, a defocused continuous laser beam was directed onto the recorded dots with the sample mounted on a mechanically driven stage. The material was melted under the beam, erasing the recorded dots. Column 4 in the table indicates the number of write-erase cycles achieved for the various samples. These numbers represent the cycles attempted and succeeded and do not represent the maximum cycles possible.

TABLE II

Static Test

| Sample | Tg °C. | Exposure energy ergs/dot | Write/erase cycles | Pulse duration |
|---|---|---|---|---|
| 1 | 131 | 0.01 | 10 | 50 ns |
| 2 | 111 | 0.005 | 6 | 50 ns |
| 3 | 83 | 0.0075 | 10 | 50 ns |
| 4 | 70 | 0.005 | 10 | 50 ns |
| 5 | — | 0.005 | 15 | 50 ns |

EXAMPLE 5

Operational Test on Optical Recording Equipment

An operational test was performed on Sample #1 of Example 4. In this test the material was spin-coated on a 12" aluminum optical disc to give approx. 0.1 micrometer dry coating, and tested on the Optical Recorder.

In the Recorder, (see FIG. 4) RF signals of test patterns of color bars were generated and monitored by CRT #1. The RF signal was converted to light pulses using an acousto-optic modulator and directed on the disc using a microscope objective with a servo focusing system and tracking mechanism. The signal reflected from the disc was monitored by a second CRT. Color bars were again displayed but they now showed imperfections such as movie patterns, white and darks flashes, etc. due to defects of the coating. The signal was recorded at different incident power levels and played back by a second optical system using a HeNe laser. The playback of the recorded signal was monitored by a third CRT. For a recording level of 20 mW (or higher), the display on the third CRT was essentially that of the second CRT, indicating recording was achieved at 20 mW incident beam power for sample #1 of Example 4.

EXAMPLE 6

Polymeric cyanine dyes (XI)a) and (XII)d) of Table 1 were spin-coated from a solution in 1,2-dichloroethane/cyclohexanone. For each dye a trilayer, a bilayer, and a bilayer with binder coating was made.

trilayer—glass substrate with a Cu reflecting layer on which a 1200 Å spacer layer of SiO$_2$ was applied and finally the polymeric dye layer bilayer—glass substrate with 1000 Å Al reflecting layer on which the polymeric dye was applied directly bilayer+Binder-glass substrate with 1000 Å Al reflecting layer on which was coated a 5:8 weight ratio mixture of the polymeric dye and Staybelite Ester 10 from Hercules Inc.

Static exposure tests (TABLE III) were made using a focused dot of 1 micrometer diameter from a laser diode emitting 815 nm infrared radiation.

TABLE III

Static Test Results

| Polymeric dye | Configuration | Threshold power for 50 ns, 800 nm |
|---|---|---|
| XI-a | trilayer dye/SiO$_2$/Al | 4.9 mW |
| XI-a | bilayer dye/Al | 7.9 mW |
| XI-a + Binder (5:8) | bilayer (dye + binder)/Al | did not write |
| XII-d | bilayer dye/Al | 5.00 mW |
| XII-d | trilayer dye/SiO$_2$/Cu | 6.2 mW |
| XII-d + Binder | bilayer (dye + binder)/Al | did not write |

In the (polymeric dye-binder)/Al constructions, dots can be recorded only at longer pulse-duration (>100 ns) while in all of the other samples, when the binder was eliminated, dots could be recorded at 50 ns.

EXAMPLE 7

The following polymeric azo dyes were prepared using different non-chromophoric monomeric linking groups A. The resulting Tg values are given. ελmax in the range 2.5–3.0×10$^4$ L.mol$^{-1}$ cm$^{-1}$ based on the molecular weight of one unit of the polymer was obtained.

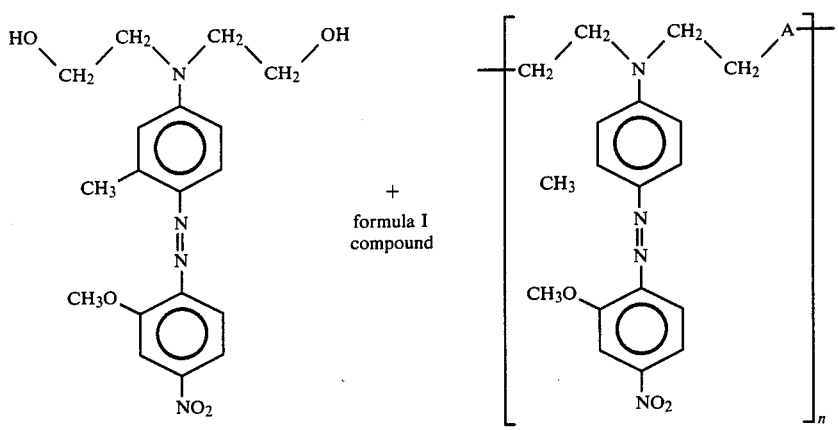

| | | |
|---|---|---|
| Polyester where | 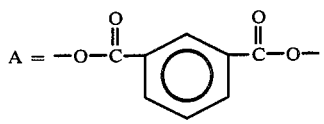 | Tg = 101° C. |
| Polycarbonate where | 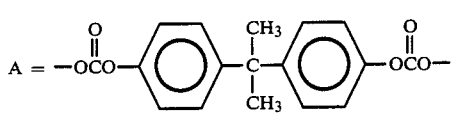 | Tg = 101° C. |
| Polyurethane where | 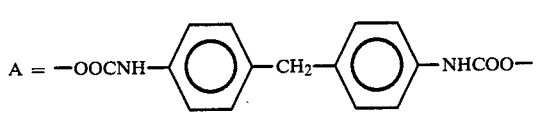 | Tg = 131° C. |
| Urethane carbonate | 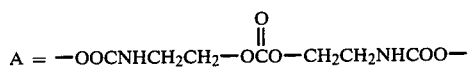 | Tg = 80° C. |

EXAMPLE 8

The following is a table of comparative tests. It will be seen that the sensitivity of the polymeric cyanine dyes representative of Class [C] formuluae (XI) and (XII) is better than other alternative dye systems.

EXAMPLE 9

Comparative tests against materials known in the art were made in terms of carrier to noise ratio (C/N) for a range of recording beam power levels. The measurements were carried out with equipment similar to that used in Example 5, with an acousto-optic modulator

TABLE IV

| Recording Medium for Optical Data Storage | | |
|---|---|---|
| | Sensitivity (Power required for recording) | Stability |
| phthalacyanines dye only format (E.P.A. 79200789) | 3.4 mW/500 ns | good stability claimed |
| nickel dithiene complex dye only format (U.S. Pat. No. 4,219,826) dye/binder format (IBM Tech. Discl. Bull) 1982, 24, No. 11B) | multiple exposure to 10 mW/50 ns pulses no data given | good stability claimed |
| cyanine dyes polymeric dyes in dye only format | static threshold 5-7 mW/50 ns | change in optical density at 820 nm in the dark <3% loss room temp./ 5 weeks <15% loss 75° C./5 weeks |
| zwitterion dye/ polymer format | equiv. sens. to calibration sample (7 mW/50 ns-dynamic thresh.) | 20% loss 75° C./2 months | giving short repetitive pulses of 50 ns duration at a frequency of 10 MHz. It is seen in FIG. 6 that the polymeric dye disk shows the threshold response (see graph D) of bilayer polymeric dye of the instant invention (as described in Example 6) which is also characteristic of the commonly used trilayer disks as shown by graph E as opposed to the broad response of both the photochromic and thermoplastic+dye systems as shown by graphs F and G, respectively. The polymeric dye also shows a carrier to noise ratio of 55 dB close to that of the trilayer disk and much higher than the others.

The polymeric dye used in these tests was

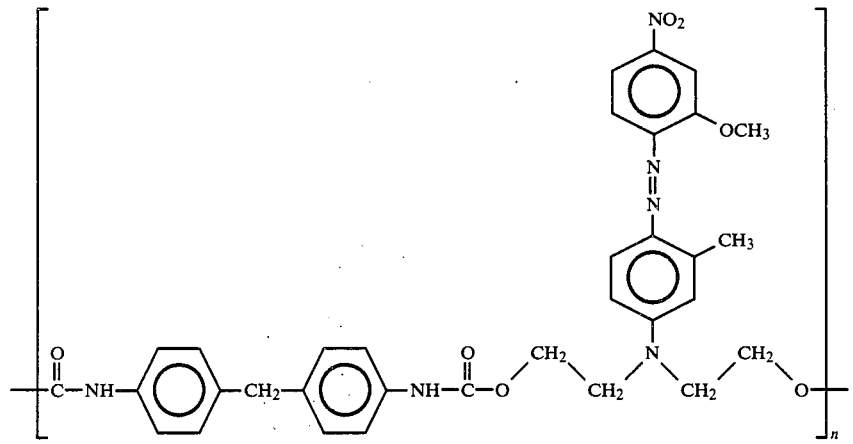

which was spin coated from an 8 weight percent solution in cyclohexanone onto an aluminum coated glass disk (see Example 6). After drying the thickness of the polymeric dye layer was 0.15 micrometers.

Various modifications and alterations of thie invention will become apparent to those skilled in the art without departing from the scope and spirit of this invention, and it should be understood that this invention is not to be unduly limited to the illustrative embodiments set forth herein.

What is claimed is:

1. An optical recording medium of thermoplastic, radiation-absorbing material which is a thin layer on a substrate comprising at least 1% by weight of at least one condensation polymeric dye, said dye being capable of selective radiation absorption in the wavelength range 300 to 1000 nm so as to allow thermoplastic deformation of said material by a focused beam of radiation so as to provide an imprinted signal on said optical recording medium which can be read by at least one of differential absorption, refraction, and scattering of a reading light beam, said optical recording medium being inert to chemical degradation or change in optical properties by the action of radiation.

2. The optical recording medium according to claim 1 wherein said medium has an absorption coefficient of at least $10^3 cm^{-1}$.

3. An optical recording medium of thermoplastic, radiation-absorbing material which is a thin layer on a substrate comprising at least 1% by weight of at least one polymeric dye, said dye being capable of selective radiation absorption in the wavelength range 300 to 1000 nm so as to allow thermoplastic deformation of said material by a focused beam of radiation so as to provide an imprinted signal on said optical recording medium which can be read by at least one of differential absorption, refraction, and scattering of a reading light beam, said optical recording medium being inert to chemical degradation or change in optical properties by the action of radiation, said polymeric dye having units of at least one of the formulae [A], [B], or [C], wherein [A] is a condensation polymer having units of the formula

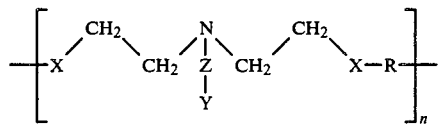

wherein
n is an integer from 5 to 100,000,
R is a straight-chain, branched, or cyclic aliphatic or single or fused ring aromatic hydrocarbon with up to 30 carbon atoms,
Z is a linking group which is an unsubstituted or substituted phenylene or naphthylene group wherein the substitution groups are —Br, —F, —OH, alkyl, alkoxy, alkylamino, dialkylamino, —NH₂, —NO₂, phenyl, carbamoyl, —CN, carbalkoxy

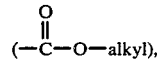

sulfonyl, sulfamyl, and sulfamido, or it is also a single bond when Y is an anthraquinone group,
Y completes an azo, tricyanovinyl, anthraquinone, polymethine, or methine chromophore, and
X is a condensation residue

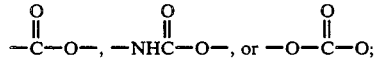

[B] is derived from copolymers of ethylenically-unsaturated monomers III and IV having 5 to 100,000 monomeric units wherein
III is an ethylenically-unsaturated monofunctional monomer not including any chromophoric moieties, selected from the group consisting of:

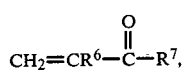

CH$_2$=CH—OR$^8$,

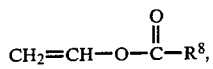

and CH$_2$=CR$^6$—CN, wherein R$^6$ is —H or —CH$_3$,

R$^7$ is —OR$^8$ or —NHR$^8$, and

R$^8$ is alkyl of (C$_1$-C$_{18}$), and

IV is a chromophore-containing ethylenically-unsaturated monomer selected from the group consisting of

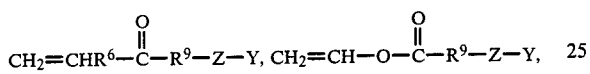

and CH$_2$=CH—O—R$^9$—Z—Y, wherein R$^6$=—H or —CH$_3$ independently of the formula III monomer, Z is a linking group as defined previously, Y is a tricyanovinyl, methine, or polymethine chromophore, and R$^9$ is an organic linking group or when Y is a tricyanovinyl, polymethine, or methine chromophore R$^9$ is also a single bond; and

[C] Tricarbocyanine polymeric dyes having units of formulae V and VI:

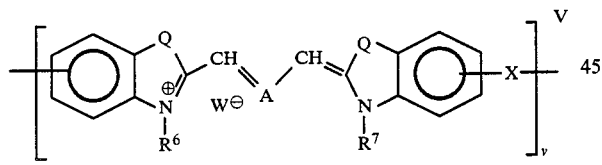

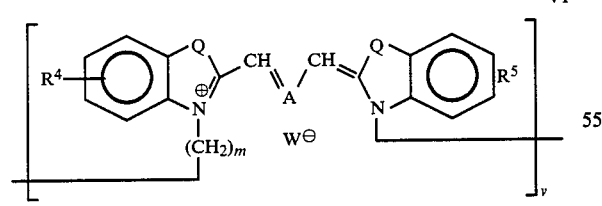

wherein

Q is

—S—, —Se— or —O—,

A is

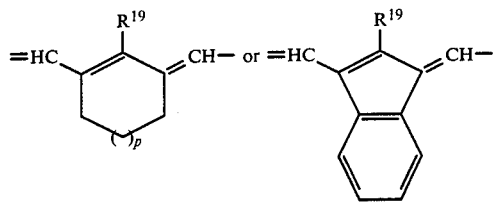

R$^{19}$ is alkyl, —Cl, amine, amine substituted by alkyl (C$_1$ to C$_4$), phenyl, or cyclized amine, p is 0 or 1, R$^6$, R$^7$ are independently alkyl of (C$_1$-C$_{30}$), R$^4$ and R$^5$ are independently H—, C$_6$H$_5$SO$_2$—, or CF$_3$SO$_2$—, X is —SO$_2$—, —CH$_2$—$_m$, or vinyl, W is a dye anion, m is an integer of 1 to 20, and v is an integer of 5 to 10,000.

4. The optical recording medium according to claim 3 wherein said polymeric dye of formula [A] has units of a condensation polymer having the formula:

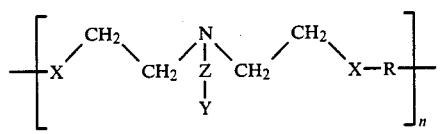

wherein n is an integer from 5 to 100,000,

R is a straight-chain, branched, or cyclic aliphatic or single or fused ring aromatic hydrocarbon with up to 30 carbon atoms, Z is a linking group which is an unsubstituted or substituted phenylene or naphthylene group wherein the substitution groups are —Br, —F, —OH, alkyl, alkoxy, alkylamino, dialkylamino, —NH$_2$, —NO$_2$, phenyl, carbamoyl, —CN, carbalkoxy

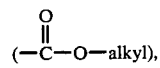

sulfonyl, sulfamyl, and sulfamido, or it is also a single bond when Y is an anthraquinone group, Y completes an azo, tricyanovinyl, anthraquinone, or methine chromophore, and X is a condensation residue

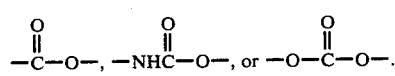

5. The optical recording medium according to claim 3 wherein said polymeric dye of formula [C] has units of a tricarbocyanine dye having formulae V and VI:

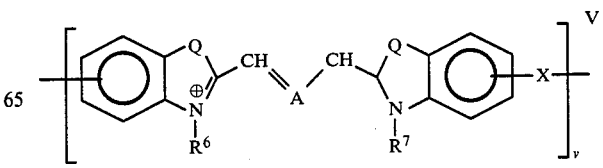

-continued

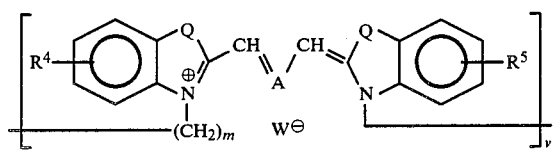
VI where
Q is

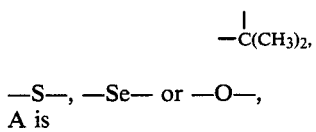

—S—, —Se— or —O—,
A is

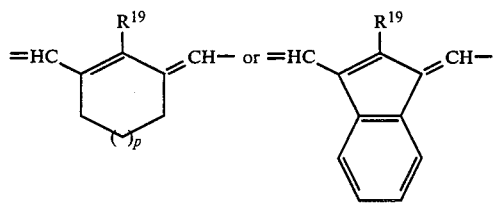

in which R$^{19}$ is alkyl, —Cl, amine, amine substituted by alkyl (C$_1$ to C$_4$) phenyl, or a cyclized amine, p is 0 or 1,
R$^6$, R$^7$ are independently alkyl of (C$_1$-C$_{30}$),
R$^4$ and R$^5$ are independently H—, C$_6$H$_5$SO$_2$—, or CF$_3$SO$_2$—,
X is —SO$_2$—, —CH$_2$)$_m$, or vinyl,
W is dye anion,
m is an integer 1 to 20, and
v is an integer 5 to 10,000.

6. The optical recording medium according to claim 3 wherein said thermoplastic radiation-absorbing material undergoes at least 10 successive thermoplastic deformations without perceptible loss in radiation absorption or thermoplastic properties.

7. The optical recording medium according to claim 3 wherein said polymeric dye has in the range of 40 to 100 mol percent polymeric dye groups.

8. The optical recording medium according to claim 3 further comprising a reflective layer between said optical recording medium and said support.

9. The optical recording medium according to claim 8 further comprising a transparent dielectric layer between said reflective layer and said optical recording medium.

10. An information recording element for optically recording optically readable information comprising:
a support that is thermally stable to or thermally insulated from heat generated in said recording element,
coated on at least one surface of said support a layer of optical recording medium of thermoplastic radiation-absorbing material comprising at least 1% by weight of at least one condensation polymeric dye, said dye being capable of selective radiation absorption so as to allow thermoplastic deformation of said material by a focused beam of radiation so as to provide an imprinted signal on said optical recording medium which can be read by at least one of differential absorption, refraction, and scattering of a reading light beam, said optical recording medium being inert to chemical degradation or change in optical properties by action of radiation.

11. The information recording element according to claim 10 wherein said medium has an absorption coefficient of at least 10$^3$ cm$^{-1}$.

12. The optical recording medium according to claim 3 wherein said polymeric dye of formula [B] has units derived from at least one of each of ethylenically-unsaturated monomers III and IV wherein
III is an ethylenically-unsaturated monofunctional monomer not including any chromophoric moieties, selected from the group consisting of:

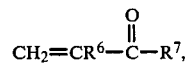

CH$_2$=CH—OR$^8$,

and CH$_2$=CR$^6$—CN,
wherein R$^6$ is —H or —CH$_3$,
R$^7$ is —OR$^8$ or —NHR$^8$, and
R$^8$ is alkyl of (C$_1$-C$_{18}$), and
IV is a chromophore-containing ethylenically-unsaturated monomer selected from the group consisting of

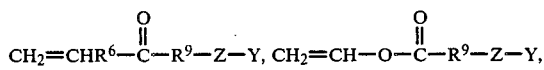

and CH$_2$=CH—O—R$^9$—Z—Y,
wherein R$^6$=—H or —CH$_3$ independently of the formula III monomer,
Z is a linking group which is an unsubstituted or substituted phenylene or naphthylene group wherein the substitution groups are —Br, —F, —OH, alkyl, alkoxy, alkylamino, dialkylamino, —HN$_2$, —NO$_2$, phenyl, carbamoyl, —CN, carbalkoxy

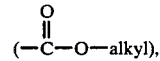

sulfonyl, sulfamyl, and sulfamido,
Y completes a tricyanovinyl, methine, or polymethine chromophore, and
R$^9$ is an organic linking group or a single bond.

13. The information recording element according to claim 10 wherein said medium has an absorption coefficient of at least 10$^3$ cm$^{-1}$.

14. An optical recording medium of thermoplastic, radiation-absorbing material which is a thin layer on a substrate comprising at least 1% by weight of at least one condensation polymeric dye, said dye being capable of selective radiation absorption in the wavelength range 300 to 1000 nm so as to allow thermoplastic deformation of said material by a focused beam of radiation so as to provide an imprinted signal on said optical recording medium which can be read by at least one of differential absorption, refraction, and scattering of a reading light beam, said optical recording medium having a thickness of less than 1 micrometer and being inert to chemical degradation or change in optical properties by the action of radiation.

15. The optical recording medium according to claim 5 wherein W of said polymeric dye is I⁻, Br⁻, Cl⁻, ClO₄⁻, BF₄⁻, PF₆⁻, CH₃SO₃⁻, perfluoroethylcyclohexylsulfonate (PECHS), or trifluoromethanesulfonate (F₃CSO₃⁻).

16. An information recording element for optically recording optically readable information comprising:
   a support that is thermally stable to or thermally insulated from heat generated in said recording element,
   coated on at least one surface of said support a layer of optical recording medium of thermoplastic radiation-absorbing material comprising at least 1% by weight of at least one polymeric dye, said dye being capable of selective radiation absorption so as to allow thermoplastic deformation of said material by a focused beam of radiation so as to provide an imprinted signal on said optical recording medium which can be read by at least one of differential absorption, refraction, and scattering of a reading light beam, said optical recording medium being inert to chemical degradation or change in optical properties by action of radiation, wherein said polymeric dye has units of at least one of the formulae [A], [B], or [C], wherein

[A] is a condensation polymer having units of the formula

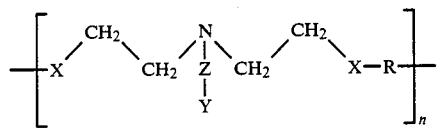

wherein n is an integer from 5 to 100,000,
R is a straight-chain, branched, or cyclic aliphatic or single or fused ring aromatic hydrocarbon with up to 30 carbon atoms,
Z is a linking group which is an unsubstituted or substituted phenylene or naphthylene group wherein the substitution groups are —Br, —F, —OH, alkyl, alkoxy, alkylamino, dialkylamino, —NH₂, —NO₂, phenyl, carbamoyl, —CN, carbalkoxy

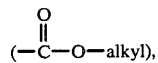

sulfonyl, sulfamyl, and sulfamido, or it is also a single bond when Y is an anthraquinone group,
Y completes an azo, tricyanovinyl, anthraquinone, polymethine, or methne chromophore, and
X is a condensation residue

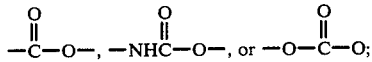

[B] is derived from copolymers of ethylenically-unsaturated monomers III and IV having 5 to 100,000 monomeric units wherein
III is an ethylenically-unsaturated monofunctional monomer not including any chromophoric moieties, selected from the group consisting of:

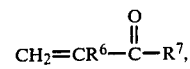

$CH_2=CH-OR^8$,

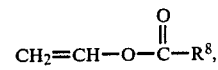

and $CH_2=CR^6-CN$,
wherein $R^6$ is —H or —CH₃,
$R^7$ is —OR⁸ or —NHR⁸, and
$R^8$ is alkyl of ($C_1$-$C_{18}$), and
IV is a chromophore-containing ethylenically-unsaturated monomer selected from the group consisting of

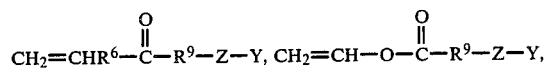

and $CH_2=CH-O-R^6-Z-Y$,
wherein $R^6=$—H or —CH₃ independently of the formula III monomer,
Z is a linking group as defined previously,
Y is a tricyanovinyl, methine, or polymethine chromophore, and
$R^9$ is an organic linking group or a single bond; and

[C] Tricarbocyanine polymeric dyes having units of the formulae V and VI:

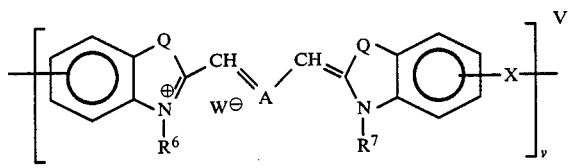

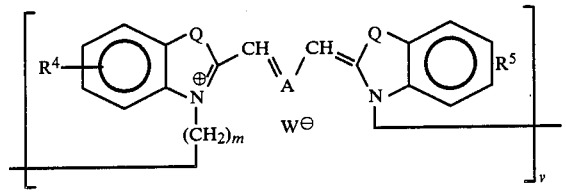

wherein Q is

—S—, —Se— or —O—,
A is

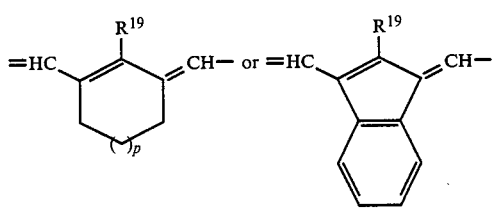

$R^{19}$ is alkyl, —Cl, amine, amine substituted by alkyl ($C_1$ to $C_4$), phenyl, or cyclized amine, p is 0 or 1, $R^6$, $R^7$ are independently alkyl of ($C_1$-$C_{30}$), $R^4$ and $R^5$ are independently H—, $C_6H_5SO_2$—, or $CF_3SO_2$—, X is —$SO_2$—, $CH_{2m}$, or vinyl, W is a dye anion, m is an integer of 1 to 20, and v is an integer of 5 to 10,000.

17. An optical recording medium of thermoplastic, radiation-absorbing material which is a thin layer on a substrate comprising at least 1% by weight of at least one polymeric dye, said dye being capable of selective radiation absorption in the wavelength range 300 to 1000 nm so as to allow thermoplastic deformation of said material by a focused beam of radiation so as to provide an imprinted signal on said optical recording medium which can be read by at least one of differential absorption, refraction, and scattering of a reading light beam, said optical recording medium having a thickness of less than 1 micrometer and being inert to chemical degradation or change in optical properties by the action of radiation, wherein said polymeric dye has units of the formulae [A], [B], or [C], wherein

[A] is a condensation polymer having units of the formula

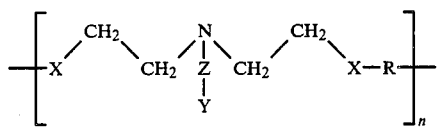

wherein n is an integer from 5 to 100,000,

R is a straight-chain, branched, or cyclic aliphatic or single or fused ring aromatic hydrocarbon with up to 30 carbon atoms, Z is a linking group which is an unsubstituted or substituted phenylene or naphthylene group wherein the substitution groups are —Br, —F, —OH, alkyl, alkoxy, alkylamino, dialkylamino, —$NH_2$, —$NO_2$, phenyl, carbamoyl, —CN, carbalkoxy

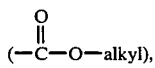

sulfonyl, sulfamyl, and sulfamido, or it is also a single bond when Y is an anthraquinone group, Y completes an azo, tricyanovinyl, anthraquinone, or methine chromophore, and X is a condensation residue

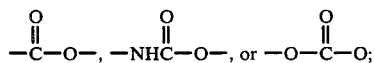

[B] is derived from copolymers of ethylenically-unsaturated monomers III and IV having 5 to 100,000 monomeric units wherein III is an ethylenically-unsaturated monofunctional monomer not including any chromophoric moieties, selected from the group consisting of:

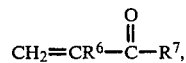

$CH_2$=CH—$OR^8$,

and $CH_2$=$CR^6$—CN, wherein $R^6$ is —H or —$CH_3$, $R^7$ is —$OR^8$ or —$NHR^8$, and $R^8$ is alkyl of ($C_1$-$CC_{18}$), and IV is a chromophore-containing ethylenically-unsaturated monomer selected from the group consisting of

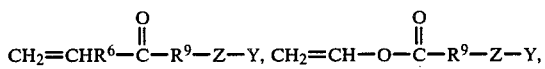

and $CH_2$=CH—O—$R^6$—Z—Y, wherein $R^6$=—H or —$CH_3$ independently of the formula III monomer, Z is a linking group as defined above, Y is a tricyanovinyl, methine, or polymethine chromophore, and $R^9$ is an organic linking group or a single bond; and

[C] Tricarbocyanine polymeric dyes having units of the formulae V and VI:

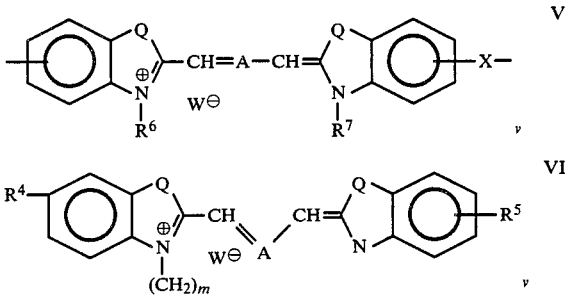

wherein Q is

—S—, —Se— or —O—,

A is

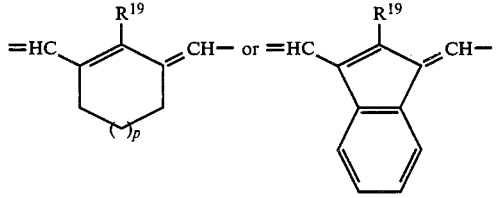

$R^{19}$ is alkyl, —Cl, amine, amine substituted by alkyl ($C_1$ to $C_4$), phenyl, or cyclized amine, p is 0 or 1, $R^6$, $R^7$ are independently alkyl of ($C_1$-$C_{30}$), $R^4$ and $R^5$ are independently H—, $C_6H_5SO_2$—, or $CF_3SO_2$—, X is —$SO_2$—, $CH_{2m}$, or vinyl, W is a dye anion, m is an integer of 1 to 20, and v is an integer of 5 to 10,000.

18. The optical recording medium according to claim 3 further comprising up to 99 weight percent of a non-chromophore-containing thermoplastic polymer.

* * * * *